(12) United States Patent
Herdade et al.

(10) Patent No.: US 11,361,550 B2
(45) Date of Patent: Jun. 14, 2022

(54) AUTOMATIC DIGITAL CONTENT CAPTIONING USING SPATIAL RELATIONSHIPS METHOD AND APPARATUS

(71) Applicant: YAHOO ASSETS LLC, Dulles, VA (US)

(72) Inventors: Simao Herdade, San Francisco, CA (US); Armin Kappeler, Thalwil (CH); Kofi Boakye, Oakland, CA (US); Joao Vitor Baldini Soares, New York, NY (US)

(73) Assignee: YAHOO ASSETS LLC, Dulles (VA)

( * ) Notice: Subject to any disclaimer, the term of this patent is extended or adjusted under 35 U.S.C. 154(b) by 151 days.

(21) Appl. No.: 16/729,982

(22) Filed: Dec. 30, 2019

(65) Prior Publication Data

US 2021/0201044 A1   Jul. 1, 2021

(51) Int. Cl.
| | |
|---|---|
| *G06V 20/40* | (2022.01) |
| *G06T 11/20* | (2006.01) |
| *G06T 7/73* | (2017.01) |
| *G06N 3/08* | (2006.01) |
| *G06N 3/04* | (2006.01) |
| *G06T 9/00* | (2006.01) |
| *G10L 13/00* | (2006.01) |

(52) U.S. Cl.
CPC .............. *G06V 20/47* (2022.01); *G06N 3/04* (2013.01); *G06N 3/08* (2013.01); *G06T 7/73* (2017.01); *G06T 9/00* (2013.01); *G06T 11/20* (2013.01); *G10L 13/00* (2013.01); *G06T 2207/20084* (2013.01); *G06T 2210/12* (2013.01)

(58) Field of Classification Search
CPC ............ G06K 9/00751; G06K 9/4628; G06K 9/6271; G06N 3/04; G06N 3/08; G06T 7/73; G06T 9/00; G06T 11/20; G06T 2207/20084; G06T 2210/12; G10L 13/00; G06V 20/47

See application file for complete search history.

(56) References Cited

U.S. PATENT DOCUMENTS

| | | | |
|---|---|---|---|
| 10,198,671 B1 * | 2/2019 | Yang | G06T 7/11 |
| 2017/0357720 A1 * | 12/2017 | Torabi | G06N 3/0445 |
| 2017/0364766 A1 * | 12/2017 | Das | G06V 20/35 |

(Continued)

OTHER PUBLICATIONS

Anderson et al., "Bottom-Up and Top-Down Attention for Image Captioning and Visual Question Answering," Computer Vision Foundation, 10 pages (2018).

(Continued)

*Primary Examiner* — Qun Shen
(74) *Attorney, Agent, or Firm* — James J. DeCarlo; Greenberg Traurig, LLP

(57) ABSTRACT

Disclosed are systems and methods for improving interactions with and between computers in content hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods provide systems and methods for automatically creating a caption comprising a sequence of words in connection with digital content.

20 Claims, 12 Drawing Sheets

(56) References Cited

U.S. PATENT DOCUMENTS

| | | | | |
|---|---|---|---|---|
| 2019/0147284 | A1* | 5/2019 | Gavrilyuk | G06T 7/73 |
| | | | | 382/103 |
| 2020/0160050 | A1* | 5/2020 | Bhotika | G06V 30/414 |
| 2020/0167943 | A1* | 5/2020 | Kim | G06T 7/174 |
| 2020/0401835 | A1* | 12/2020 | Zhao | G06N 5/022 |

OTHER PUBLICATIONS

Anderson et al., "SPICE; Semantic Propositional Image Caption Evaluation," 17 pages (2016).
Denkowski et al., "Meteor Universal: Language Specific Translation Evaluation for Any Target Language," pp. 376-380 (2014).
Devlin et al., "BERT: Pre-training of Deep Bidirectional Transformers for Language Understanding," 16 pages (2018).
Donahue et al., "Long-term Recurrent Convolutional Networks for Visual Recognition and Description," Computer Vision Foundation, pp. 2625-2634 (2015).
Fang et al., From Captions to Visual Concepts and Back, Computer Vision Foundation, pp. 1473-1482 (2015).
Girshick et al., "Rich feature hierarchies for accurate object detection and semantic segmentation," Computer Vision Foundation, pp. 1-8 (2014).
He et al., "Deep Residual Learning for Image Recognition," Computer Vision Foundation, pp. 770-778 (2016).
Hu et al., "Relation Networks for Object Detection," Computer Vision Foundation, pp. 3588-3597 (2018).
Johnson et al., "DenseCap: Fully Convolutional Localization Networks for dense Captioning," Computer Vision Foundation, pp. 4565-4574 (2016).
Karpathy et al., "Deep Visual-Semantic Alignments for Generating Image Descriptions," Computer Vision Foundation, pp. 3128-3137 (2015).
Kiros et al., "Multimodal Neural Language Models, "Proceedings of the 31st International Conference on Machine Learning, 9 pages (2014).
Lin et al., "Microsoft COCO: Common Objects in Context," http://mscoco.org, 16 pages (2014).
Lin, Chin-Yew, "ROUGH: A Package for Automatic Evaluation of Summaries," In Proceedings of Workshop on Text Summarization Branches Out, Post-Conference Workshop of ACL, Barcelona, Spain, 10 pages (2004).
Liu et al., "Context-Aware Visual Policy Network for Sequence-Level Image Captioning," Association for Computing Machinery, 9 pages (2018).
ImageCaptioning.pytorch, https://github.com/ruotianluo/ImageCaptioning.pytorch, 4 pages (2017).
Mao et al., Deep Captioning with Multimodal Recurrent Neural Networks (m-RNN), Published as a conference paper at ICLR, 17 pages (2015).
Papineni et al., "BLUE: a Method for Automatic Evaluation of Machine Translation," Proceedings of the 40th Annual Meeting of the Association for Computational Linguistics (ACL), pp. 311-318 (2002).
Radford et al., "Language Models are Unsupervised Multitask Learners," 24 pages (2019).
Ren et al., Faster R-CNN: Towards Real-Time Object Detection with Region Proposal Networks, Microsoft Research, pp. 1-9 (2015).
Rennie et al., "Self-critical Sequence Training for Image Captioning," Computer Vision Foundation, pp. 7008-7024 (2017).
Sharma et al., "Conceptual Captions: A Cleaned, Hypernymed, Image Alt-text Dataset for Automatic Image Captioning," Proceedings of the 56th Annual Meeting of the Association for Computational Linguistics (Long Papers), pp. 2556-2565 (2018).
Yao et al., "Exploring Visual Relationship for Image Captioning," Computer Vision Foundation, pp. 1-16 (2018).
Vaswani et al., "Attention Is All You Need," 31st Conference on Neural Information Processing Systems, pp. 1-11 (2017).
Vendantam et al., "CIDEr: Consensus-based Image Description Evaluation," Computer Vision Foundation, pp. 4566-4575 (2015).
Vinyals et al., "Show and Tell: A Neural Image Caption Generator, "Computer Vision Foundation, pp. 3156-3164 (2015).
Xu et al., "Show, Attend and Tell: Neural Image Caption Generation with Visual Attention," Proceedings of the 32nd International Conference on Machine Learning, 10 pages (2015).
Yang et al., "Auto-Encoding Scene Graphs for Image Captioning," Computer Vision Foundation, pp. 10685-10694 (2019).
Yang et al., "Review Networks for Caption Generation," 30th Conference on Neural Information Processing Systems, pp. 1-9 (2016).
You et al., "Image Captioning with semantic Attention," Computer Vision Foundation, pp. 4651-4659 (2016).

* cited by examiner

AUTOMATIC DIGITAL CONTENT CAPTIONING USING SPATIAL RELATIONSHIPS METHOD AND APPARATUS

FIELD OF THE DISCLOSURE

The present disclosure relates to improvements to digital content captioning systems and specifically to using determined spatial relationships between objects in an image in generating an image caption.

BACKGROUND

Automated digital content (e.g., image) captioning involves automatically generating, using natural language processing and computer vision, a natural language description of content within an image by analyzing content in the image. A considerable number of digital images are available in a digital environment, e.g., the Internet. Many of the digital images have little if any textual description of the content depicted in the digital images. A textual description, or alternative description, can enhance the experience of viewing an image. A description can be used by humans to assist them in interpreting the contents of the image, for example. Online users encounter content on virtually every web page visited via the Internet.

Currently, deep learning is used to provide both the computer vision component and the natural language processing component in the automatic generation of an image caption. For the computer vision component, deep learning typically uses a convolutional neural network (CNN) to encode the input image into an intermediate representation. The intermediate representation might comprise a single feature vector or multiple visual features obtained from different regions within the image. The intermediate representation is fed to the natural language processing component, which typically comprises a recurrent natural network (RNN), to perform language modeling to generate a natural language caption for the input image.

There are deficiencies associated with the current approach which limit the ability of a deep learning computing system to generate an accurate natural language caption. More particularly, the current approach fails to extract features of the input image that are important in generating a natural language caption for the input image.

SUMMARY

The present disclosure provides novel systems and methods for automatic generation of an image caption for digital image content of a digital image using deep learning and spatial relationships between detected objects depicted in the digital content item. Examples of object spatial relationship information include relative position and relative size of objects depicted in digital image content.

Presently, deep learning approaches ignore spatial relationships between objects depicted in a digital image. Object spatial relationship information is important in understanding the content within an image. Relative position, for example, can aid in distinguishing "a girl riding a horse" from "a girl standing beside a horse". Similarly, relative size can help differentiate between "a woman playing the guitar" and "a woman playing the ukulele".

The automatic digital content captioning described herein enables automatic generation of improved image captions demonstrating enhanced spatial awareness. This presents improvements to the quality of, and dissemination of, image captions for digital image content.

In accordance with one or more embodiments, disclosed systems and methods automatically generate a caption comprising a textual description of a digital content item. The automatically-generated caption can be presented to an online user via an electronic communications network, such as the Internet. By way of one non-limiting example, the automatically-generated caption can be made available (e.g., caused to be displayed at a user device) so that the user can read the caption. In addition or as an alternative to visual presentation of the automatically-generated caption, the automatically-generated caption can be transmitted (e.g., via the Internet) to a user device causing the automatically-generated caption to be output in an audible format—e.g., text of the automatically-generated caption can be converted to audio output using text-to-speech software—at the user device (e.g., so that the user, such as a visually-impaired user, can listen to the caption to discern the image's contents).

According to some embodiments, the disclosed systems and methods use spatial relationship modeling and deep learning provided by an Object Relation Transformer (ORT) comprising an encoder-decoder architecture, which incorporates object spatial relationship information in the ORT's encoder. The ORT's use of spatial relationship information is in stark contrast with a typical current approach which does not use spatial relationship information. In accordance with at least one embodiment disclosed herein, object spatial relationship information determined using geometric feature information associated with objects detected in digital content is used by the ORT's encoder to generate encoded output, and the encoded output is then used by the ORT's decoder to automatically generate an image caption. In some embodiments, the ORT architecture uses a bottom-up visual encoder as well as positional encoding.

According to some embodiments, the disclosed systems and methods first use an object detector to detect objects in digital content (e.g., a digital image). In accordance with one or more embodiments, the object detector identifies a bounding box around each detected object. A bounding box (e.g., rectangle) indicates the position and shape of objects in the digital image. Appearance and geometry features are then extracted from the objects detected in the image. For each bounding box, appearance features (e.g., high-dimensional vectors) are determined using the digital content (e.g., digital content contained in the bounding box, etc.). In accordance with some embodiments, the appearance features for an object's bounding box represent the content of the image that lies within the object's bounding box. In addition, an object's appearance features can take into account regions outside the object's bounding box. By way of a non-limiting example, image content from one or more regions outside an object's bounding box can be used in determining intermediate features that lie within the bounding box. The intermediate features can then be used to generate the final appearance features for the detected object. In addition and for each object, the geometry features comprise height, width and center coordinates corresponding to the object's bounding box.

The disclosed systems and methods then provide the appearance and geometry features generated for the detected objects as input to the ORT's encoder, which encodes the input features into a set of features (one feature vector for each of the detected objects in the digital content item) as encoded output. In accordance with one or more embodiments, the ORT's encoder and decoder are each comprised of a number of layers. In accordance with one or more embodiments, the ORT's encoder comprises multiple layers comprising an initial, projection layer and a number of encoder (or encoding) layers—each of the encoder layers comprising a geometric attention mechanism that operates to incorporate the geometry features of the detected objects into the encoding process performed by the ORT's encoder. By virtue of this arrangement and in accordance with one or more disclosed embodiments, when an object is encoded using the ORT's encoder, geometry features from other relevant detected objects can also be used. For each object, the geometric attention mechanism allows the encoding process to focus on (or pay attention to) the particular set of objects that are relevant to the object being encoded. The geometric attention mechanism takes into account the relative position and size between pairs of objects, and can combine this information based on the objects' features. In accordance with one or more embodiments, the geometry features are used by encoder layers of the ORT's encoder to generate attention weights reflective of the geometry features of detected objects. In accordance with at least one embodiment, the ORT's encoder outputs a set of feature vectors (e.g., one for each detected object) which is input to the ORT's decoder, the latter of which generates an image caption as a sequence of words as output.

It will be recognized from the disclosure herein that embodiments of the instant disclosure provide improvements to a number of technology areas, for example those related to systems and processes that handle or process digital images and delivery of such digital images and associated captions to users over the internet.

In accordance with one or more embodiments, a method is disclosed which includes obtaining, at a computing device, a digital content item; analyzing, via the computing device, the digital content item to detect a plurality of objects depicted in the digital content item, the analysis comprising determining a bounding box for each object of the plurality; determining, via the computing device and for each object of the plurality, an n-dimensional appearance feature vector for the object, the appearance feature vector determination comprising analyzing content of the digital content item to generate the n-dimensional appearance feature vector; determining, via the computing device and for each object of the plurality, a set of geometry features for the object using the bounding box determined for the object; generating, via the computing device and using a trained transformer machine model, encoded output using an encoder of the trained transformer, the n-dimensional appearance feature vector and the set of geometry features determined for each object of the plurality, the encoded output generation comprising the encoder using spatial relationships among the plurality of objects identified using the set of geometry features determined for each object of the plurality; and automatically creating, via the computing device and using the trained transformer machine model, a caption comprising a sequence of words, the automatic caption creation comprising using a decoder component of the trained transformer to decode the encoded output to identify the sequence of words.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically generating a caption for a digital content item using spatial relationships between detected objects depicted in the digital content item.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

Figure 1:
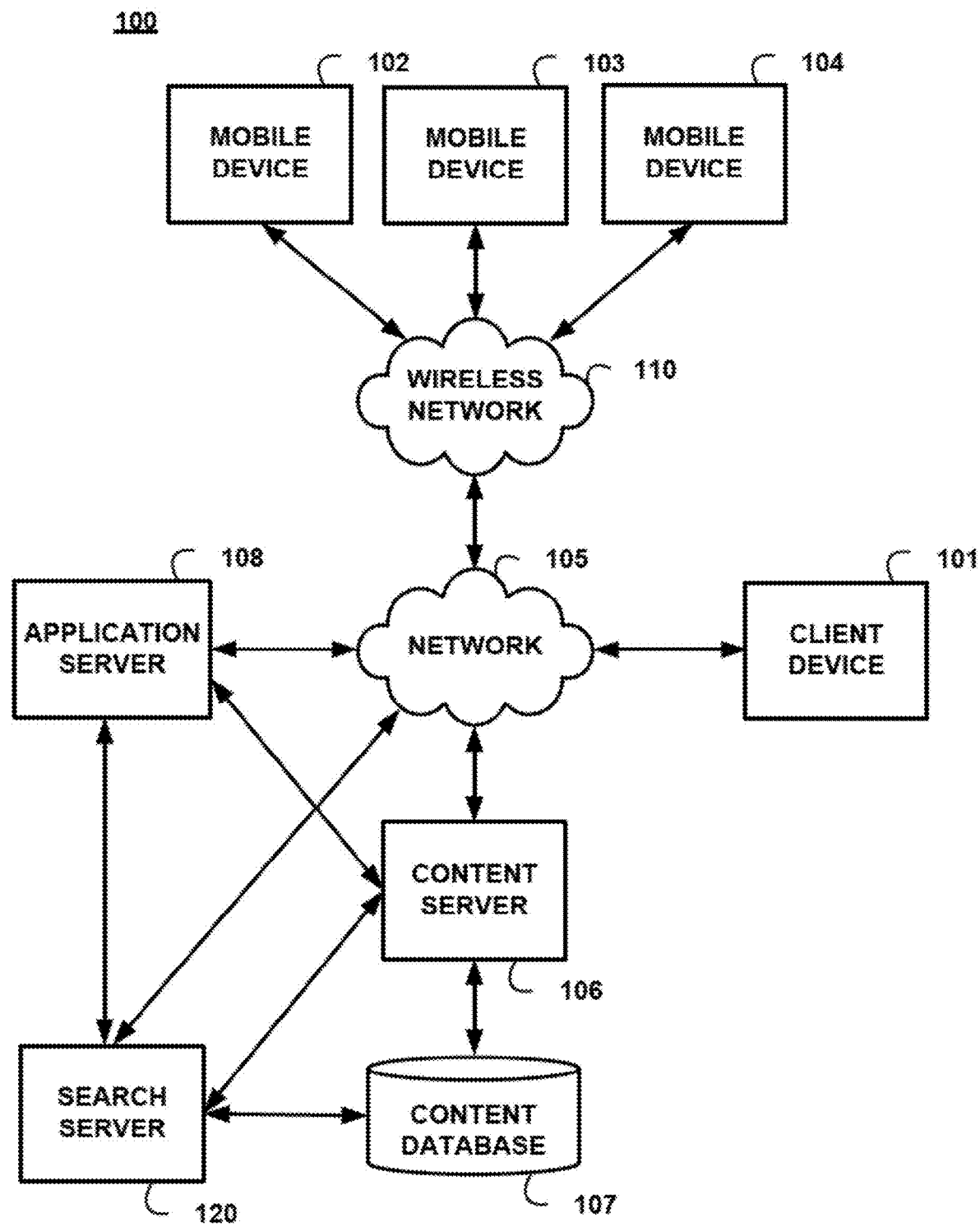
FIG. 1 is a schematic diagram illustrating an example of a network within which the systems and methods disclosed herein could be implemented according to some embodiments of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may comprise a graphical processing unit (GPU) for efficiently running one or more deep learning algorithms in accordance with at least one embodiment. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

The principles described herein may be embodied in many different forms. By way of background, deep learning techniques are used in encoding, decoding and generating a caption. Current deep learning techniques fail to make use of both appearance and geometry features in generating a caption. As a result, the current deep learning techniques are lacking in their ability to generate accurate captions. It is important to ensure that a caption is as accurate as possible, since it is very likely to be presented to users with the digital content item.

With the widespread use of digital content captions with the presentation of digital content items (e.g., via a browser application's display of such information received via the web), there is currently a significant need for improvements in the automatic generation of digital content captions to accompany digital content items presented to users. However and as discussed above, existing systems fail to consider information (spatial relationship information) which is important in generating an accurate caption for a digital content item. Object spatial relationship information is important in understanding relationships between objects depicted in the content of a digital content item. Relative position, for example, can aid in distinguishing "a girl riding a horse" from "a girl standing beside a horse". Similarly, relative size can help differentiate between "a woman playing the guitar" and "a woman playing the ukulele".

The conventional approach to digital content caption creation fails to account for spatial relationships.

As such, the instant disclosure provides a novel solution addressing the immediate demand for an automated system, application and/or platform that generates a caption using spatial relationship information associated with objects detected in a digital content item (e.g., a digital image). The present disclosure provides novel systems and methods for automatic generation of a caption representing content of a digital content item (e.g., a digital image) using deep learning and spatial relationships between detected objects depicted in the digital content item. Examples of object spatial relationship information include relative position and relative size of objects depicted in digital content item.

According to some embodiments, the disclosed systems and methods use spatial relationship modeling and deep learning provided by an Object Relation Transformer (ORT) comprising an encoder-decoder architecture, which incorporates object spatial relationship information in the ORT's encoder, which then uses the object spatial relationship information in encoding each token (e.g., n-dimensional appearance feature vector) corresponding to an object detected in the digital content item.

The ORT's use of spatial relationship information is in stark contrast with the current approach which does not use spatial relationship information. In accordance with at least one embodiment disclosed herein, object spatial relationship information determined using geometric feature information associated with objects detected in a digital content item is used by the ORT's encoder to generate encoded output, and the encoded output is then used by the ORT's decoder to automatically generate a caption. In some embodiments, the ORT architecture can use a bottom-up visual encoder as well as positional encoding.

According to some embodiments, the disclosed systems and methods first use an object detector to detect objects in a digital content item (e.g., a digital image). In accordance with one or more embodiments, the object detector identifies a bounding box around each detected object. A bounding box (e.g., rectangle) indicates a position and shape of an object in the digital content item. Appearance and geometry features are then extracted for each of the objects detected in the digital content item. For each bounding box corresponding to a detected object, an n-dimensional appearance feature vector is determined using the digital content (e.g., digital content contained in the bounding box, etc.). The n-dimensional appearance feature vector determined for an object represents the appearance of the digital content that lies within the object's bounding box. In addition and for each object, a set of geometry features is determined for each object in accordance with the object's bounding box. In addition, an object's appearance features can take into account regions outside the object's bounding box. By way of a non-limiting example, image content from one or more regions outside an object's bounding box can be used in determining intermediate features that lie within the bounding box. The intermediate features can then be used to generate the final appearance features for the detected object. In accordance with one or more embodiments, a set of geometry features determined (using the bounding box) for a detected object can comprise height (e.g., which can be determined to be a function of the height of the bounding box), width (e.g., which can be determined to be a function of the width of the bounding box) and the center coordinates corresponding to the object's bounding box.

The disclosed systems and methods then provide the appearance and geometry features generated for the detected objects as input to the ORT's encoder, which encodes the input features into a set of feature vectors (e.g., one for each detected object) in the course of generating encoded output given an input image. In accordance with one or more embodiments, the ORT's encoder and decoder are each comprised of a number of layers. In accordance with one or more embodiments, the ORT's encoder comprises multiple layers comprising an initial layer (referred to herein as a projection layer of the encoder) and a number of encoder layers—each of the encoder layers comprising a geometric attention mechanism that operates to incorporate the geometry features of the detected objects into the encoding process performed by the ORT's encoder. By virtue of this arrangement and in accordance with one or more disclosed embodiments, when an object is encoded using the ORT's encoder, geometry features from other relevant detected objects can be used in combination with appearance features.

For each object, an encoder layer's geometric attention mechanism allows the encoding process to focus on (or pay attention to) the particular set of objects that are spatially relevant to the object being encoded. The geometric attention mechanism takes into account the relative position and size between pairs of objects, and can use this information together with appearance features of the objects. In accordance with at least one embodiment, the ORT's encoder outputs a set of feature vectors (e.g., one for each detected object) which becomes an input to the ORT's decoder, the latter of which generates an image caption as a sequence of words as output.

Examples of benefits derived from the disclosed systems and methods include: 1) the disclosed systems and methods provide a technologically based mechanism for automatic generation of image captions from digital content; and (2) the disclosed systems and methods are based on techniques that are specifically designed to incorporate spatial relationships between objects detected in digital content to generate an encoded output which is then used by a decoder to generate a caption for the digital content item, which has never been performed before. The disclosed systems and methods provide an improved mechanism to automatically generate a caption for a digital content item.

The disclosed systems and methods can be implemented for any type of digital content item, including, but not limited to, video, audio, images, text, and/or any other type of multimedia content. While the discussion herein will focus on digital image content items (or images), it should not be construed as limiting, as any type of content or multimedia content, whether known or to be known, can be utilized without departing from the scope of the instant disclosure.

Certain embodiments will now be described in greater detail with reference to the figures. The following describes components of a general architecture used within the disclosed system and methods, the operation of which with respect to the disclosed system and methods being described herein. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as, by way of non-limiting examples, content server 106, application (or "App") server 108, search server 120 and advertising ("ad") server (not shown).

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., YouTube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108 and 120 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like. A server may comprise a GPU for efficiently executing one or more deep learning algorithms in accordance with at least one embodiment.

In some embodiments, users are able to access services provided by servers 106, 108 and/or 120. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120, or an ad server or ad network.

Moreover, although FIG. 1 illustrates servers 106, 108 and 120 as single computing devices, respectively, the disclosure is not so limited. For example, one or more functions of servers 106, 108 and/or 120 may be distributed across one or more distinct computing devices. Moreover, in one embodiment, servers 106, 108 and/or 120 may be integrated into a single computing device, without departing from the scope of the present disclosure.

Figure 2:
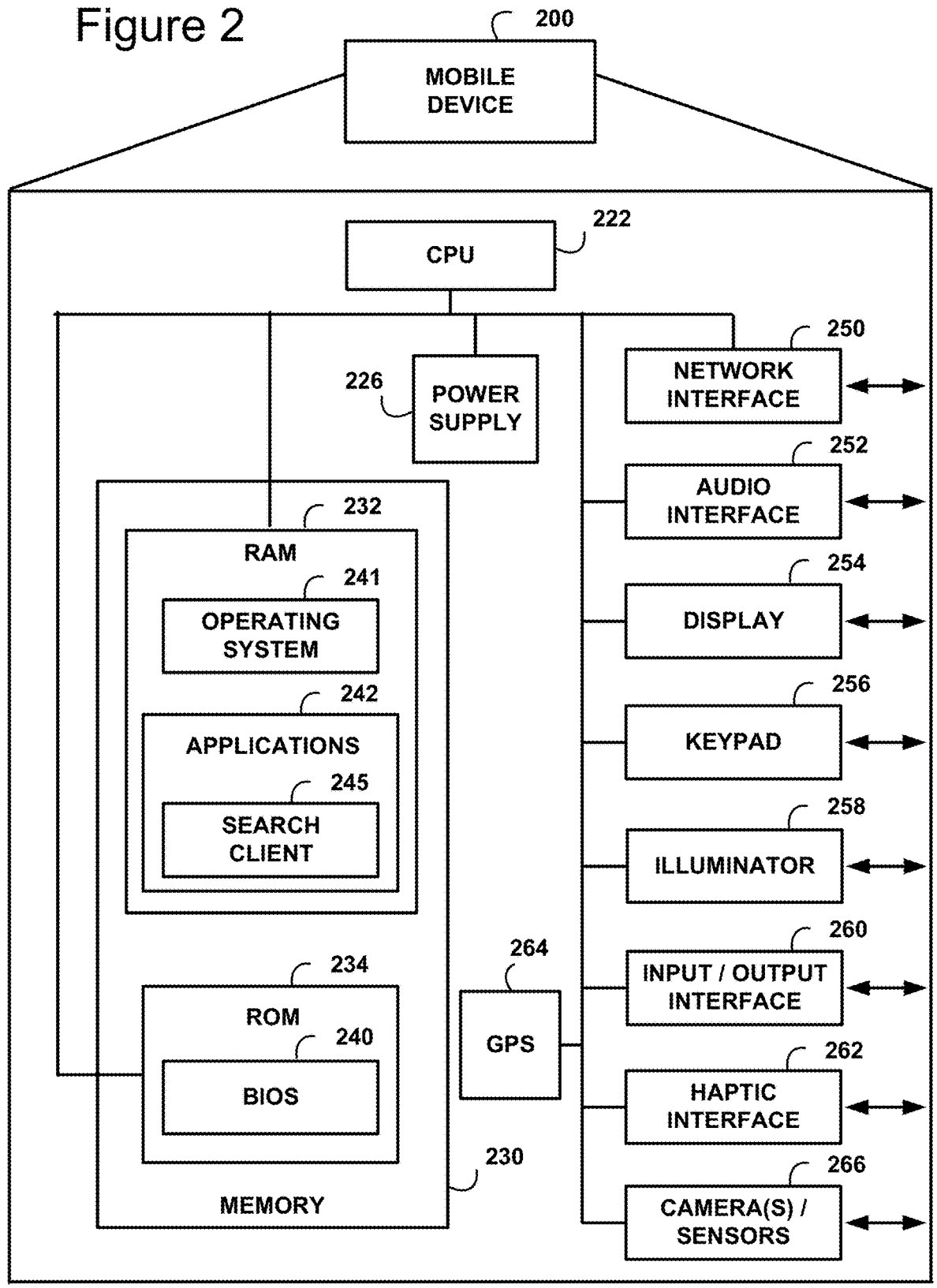
FIG. 2 depicts a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the client device 200 receives a communication from another user.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, client device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by client device 200 to store, among other things, applications 242 and/or other data. For example, data stores may be employed to store information that describes various capabilities of client device 200. The information may then be provided to another device based on any of a variety of events, including being sent as part of a header during a communication, sent upon request, or the like. At least a portion of the capability information may also be stored on a disk drive or other storage medium (not shown) within client device 200.

Applications 242 may include computer executable instructions which, when executed by client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Figure 3:
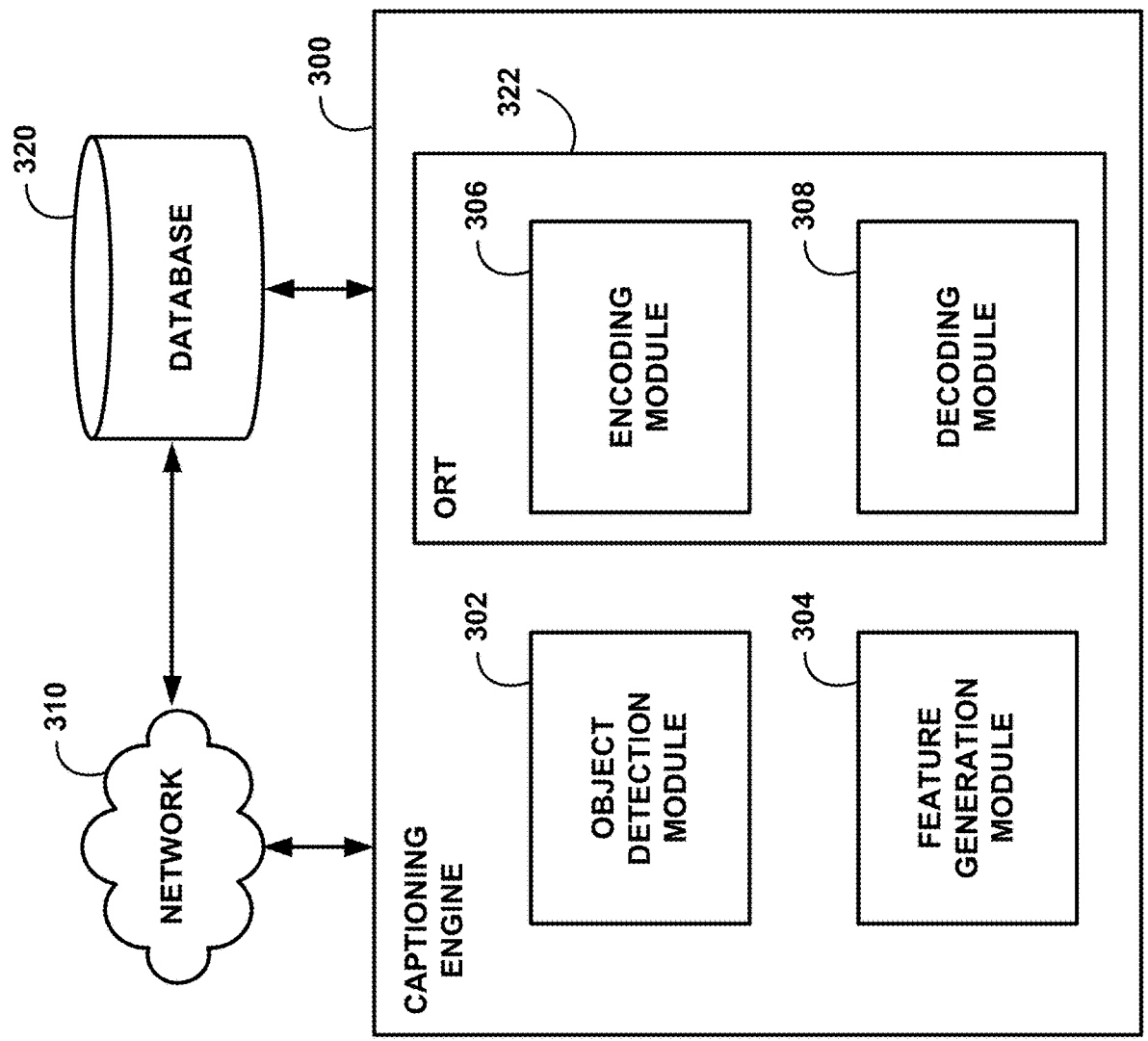
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a captioning engine 300, network 310 and database 320. The engine 300 can be a special purpose machine or processor and could be hosted by an application server, content server, social networking server, web server, search server, content provider, email service provider, ad server, user's computing device, and the like, or any combination thereof.

According to some embodiments, engine 300 can be embodied as a stand-alone application that executes on a user device. In some embodiments, the engine 300 can function as an application installed on the user's device, and in some embodiments, such application can be a web-based application accessed by the user device over a network.

The database 320 can be any type of database or memory, and can be associated with a content server on a network (such as and without limitation a content server, search server, application server, etc.) or a user's device. In some embodiments, database 320 comprises a dataset of data and metadata associated with local and/or network information related to users, services, applications, content (e.g., video) and the like. Such information can be stored and indexed in the database 320 independently and/or as a linked or associated dataset. It should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof.

In some embodiments, database 320 can store data (e.g., digital content, feature data, encoder data, decoder data, etc.) used by engine 300 in generating image captions. In accordance with one or more embodiments, database 320 can comprise data to train, test and validate the ORT comprising an encoder, decoder, learned data (e.g., matrices, vectors), learned functions, etc.

The network 310 can be any type of network such as, but not limited to, a wireless network, a local area network (LAN), wide area network (WAN), the Internet, or a combination thereof. The network 310 facilitates connectivity of the engine 300, and the database of stored resources 320. Indeed, as illustrated in FIG. 3, the engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as engine 300, and includes object detection module 302, feature generation module 304, encoding module 306, and decoding module 308. In the example shown in FIG. 3, encoding module 306 and decoding module 308 are components of Object Relation Transformer (ORT) 322, which uses deep learning in generating a caption reflective of determined spatial relationships between objects detected in the digital content for which the caption is being generated. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

As discussed in more detail below, the information processed by the engine 300 can be supplied to the database 320 in order to ensure that the information housed in the database 320 is up-to-date as the disclosed systems and methods leverage real-time information during or responsive to image caption creation, as discussed in more detail below.

Figure 4:
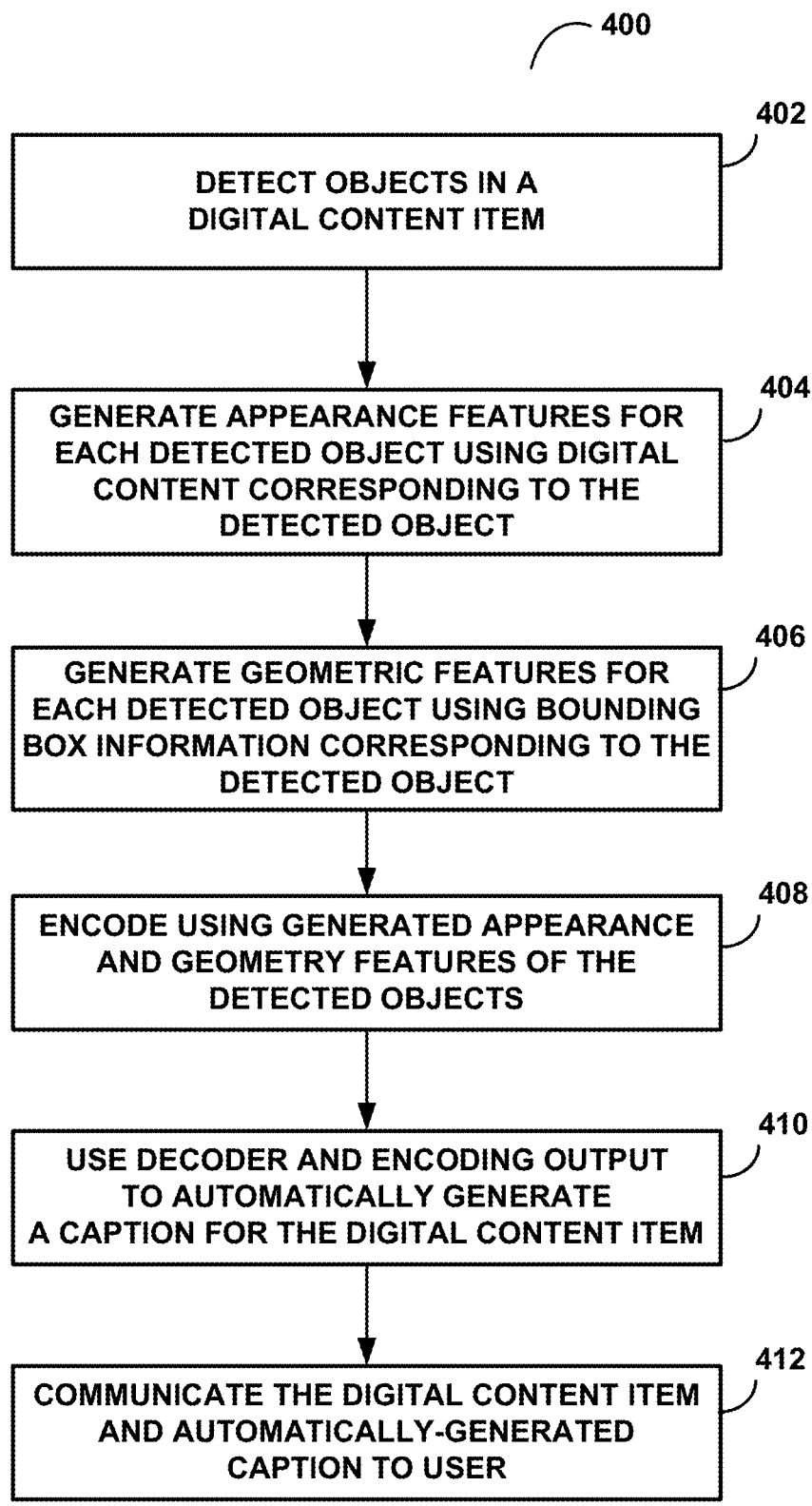
FIG. 4 is a flowchart illustrating steps performed in accordance with some embodiments of the present disclosure.

FIG. 4 provides a process flow overview in accordance with one or more embodiments of the present disclosure. Process 400 of FIG. 4 details steps performed in accordance with exemplary embodiments of the present disclosure for automatically generating an image caption reflecting content of a digital content item (e.g., an image) using spatial relationships between detected objects depicted in the digital content item. According to some embodiments, as discussed herein with relation to FIG. 4, the process involves automatically detecting a number of objects in a digital content item and extracting appearance and geometry features corresponding to each detected object. In addition, the process involves using the appearance and geometry features to generate encoded output which is then decoded in order to automatically generate a caption (comprising a sequence of words) for the digital content item. The fully-automated process 400 of automatically generating a caption using captioning engine 300 is discussed in more detail below.

At step 402 (of FIG. 4), which is performed by object detection module 302 (of FIG. 3), some or all of the objects depicted in a digital content item (e.g., a digital image) are detected. By way of some non-limiting examples, the digital content item can be obtained in various manners including and without limitation retrieved from database 320, received from a user (e.g., in a request to generate a caption, as part of a digital content upload, etc.), retrieved from the web (e.g., retrieved during a web crawl, transmitted by a digital content provider's server, etc.).

In accordance with one or more embodiments, a convolutional neural network (CNN) can be used for object detection and feature extraction. By way of one non-limiting example, the CNN can comprise a Faster R-CNN with ResNet-101. ResNet (residual neural network) 101 is a convolutional neural network that is trained on more than a million images from the ImageNet database. The ResNet 101 generates intermediate feature maps, which are used by a Region Proposal Network (RPN) to generate bounding boxes for object proposals. By way of a further non-limiting example, the faster-R-CNN with ResNet-101 is a pre-trained model which can be trained using the Microsoft COCO (MS-COCO) 2014 Captions dataset with ground-truth annotated bounding boxes.

In accordance with one or more disclosed embodiments, overlapping bounding boxes are analyzed (e.g., non-maximum suppression analysis) to identify the most likely bounding box for each object detected in the digital image content. By way of a non-limiting example, non-maximum suppression can be used to cluster bounding box object proposals by spatial closeness measured using Intersection-over-Union (IoU). In accordance with some embodiments, overlapping bounding boxes with a spatial closeness (measured using IoU) exceeding a certain spatial closeness threshold (e.g., 0.7) can be discarded. The larger the spatial closeness threshold, the less confident proposals are likely to be suppressed. On the other hand, a smaller spatial closeness threshold results in increased suppression of proposed bounding boxes and reduced recall. By way of a non-limiting example, given two overlapping bounding boxes with a spatial closeness score above the spatial closeness threshold, the one with the highest criterion score can be kept and the one with the lower criterion score can be discarded. The criterion score can be defined in different ways (e.g., as a probability predicted by a trained model) and typically reflects the confidence that the detection component (e.g., object detection module 302) assigns to a bounding box.

Figure 5:
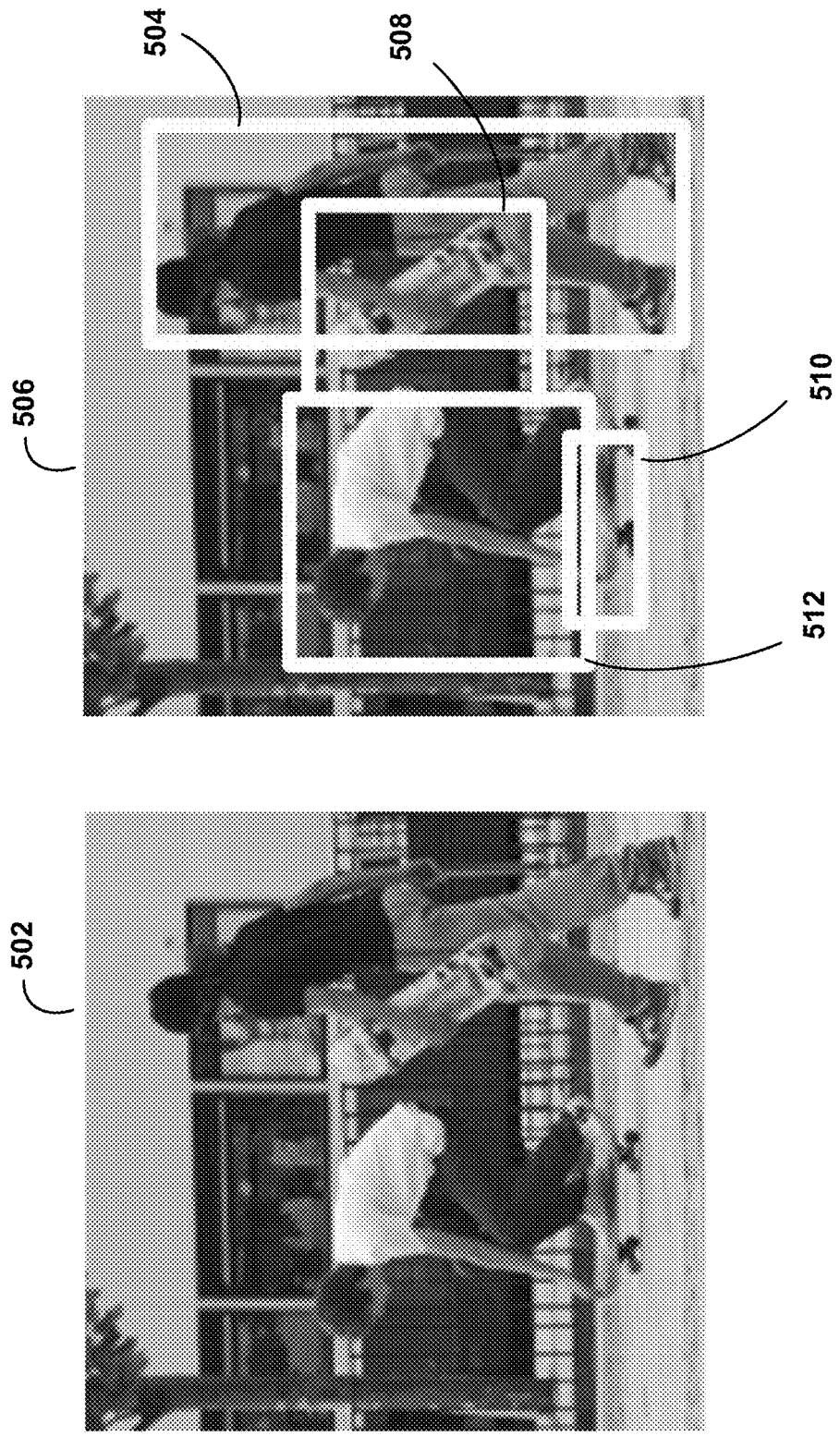
FIG. 5 is a diagram of an exemplary example of a non-limiting embodiment in accordance with some embodiments of the present disclosure.

Reference is made to FIG. 5, which provides an example of digital image 502 input to captioning engine 300. In the example shown in image 502, four objects are detected (by object detection module 302)—two of which depict two young men and the other two of which depict skate boards. In addition, FIG. 5 provides element 506 illustrating bounding boxes 504, 508, 510 and 512, each of which corresponds to a detected object and provides positioning information (e.g., x and y coordinates in a two-dimensional coordinate system) of the four corners (or four vertices) of the bounding box for each detected object. As is discussed in more detail below, determination of geometry features of a detected object use the bounding box information to determine a height, width, and center (of a bounding box) corresponding to the detected object.

In accordance with one or more embodiments, a region-of-interest (RoI) pooling layer can be used to convert the bounding boxes (e.g., the bounding boxes remaining after the IoU processing) to the same spatial size (e.g., 14×14× 2048 pixels). In some embodiments, additional CNN layers can be applied to predict class labels and make bounding box refinements for each proposed bounding box.

In addition and in accordance with one or more embodiments, a class prediction probability associated with each bounding box can be used to determine whether to retain or discard a proposed bounding box. By way of one non-limiting example, class prediction probability threshold of 0.2 can be used. By way of a further non-limiting example, each proposed bounding box having a class prediction below the threshold is discarded and each proposed bounding box having a class prediction probability equal to or greater than the threshold is retained.

At step 404, which is performed by feature generation module 304 of engine 300, appearance features are generated for each detected object. In accordance with one or more embodiments, a mean-pooling mechanism can be applied over the spatial dimension of an object's bounding box to generate a n-dimensional appearance feature vector (e.g., a 2048-dimension appearance feature vector) for each object bounding box. In accordance with some embodiments, the appearance features for an object's bounding box represents the content of the image that lies within the object's bounding box. In addition, an object's appearance features can take into account regions outside the object's bounding box. By way of a non-limiting example, image content from one or more regions outside an object's bounding box can be used in determining intermediate features that lie within the bounding box. The intermediate features can then be used to generate the final appearance features for the detected object. In addition and for each object, the set geometry features comprise height, width and center coordinates corresponding to the object's bounding box.

At step 406, which is also performed by feature generation module 304 of engine 300, geometry features are generated for each object detected in the digital content item (at step 402). In accordance with some embodiments, the geometry features for a detected object comprise x and y coordinates of a center of the bounding box determined (in step 402) for the detected object, the height of the bounding box and the width of the bounding box. By way of a further non-limiting example, the x and y coordinates associated with vertices of the corresponding bounding box can be used to determine the height, width and center (in x and y coordinates) of the bounding box.

At step 408, the appearance and geometry features are used by the ORT's encoder to generate encoded output, as is discussed in more detail below. At step 410 and as is discussed in more detail below, the encoded output is used by the ORT's decoder to automatically generate a caption corresponding to the digital content item. At step 412, the digital content item and the automatically-generated caption are communicated to the user. By way of one non-limiting example, the digital content item and automatically-generated caption can be communicated by a server (e.g., content server 106, application server 108, search server 120, etc.) over an electronic communications network (e.g., the Internet) to an application (e.g., browser application) executing on the user's computing device (e.g., client device, mobile device 200, etc.) resulting in the digital content item being displayed with the automatically-generated caption in the user interface (e.g., an application user interface) of the user's computing device. In addition or as an alternative to visual presentation of the automatically-generated caption, the automatically-generated caption can be transmitted (e.g., via the Internet) to a user device causing the automatically-generated caption to be output in an audible format—e.g., text of the automatically-generated caption can be converted to audio output using text-to-speech software—at the user device (e.g., so that the user, such as a visually-impaired user, can listen to the caption to discern the image's contents).

Figure 6:
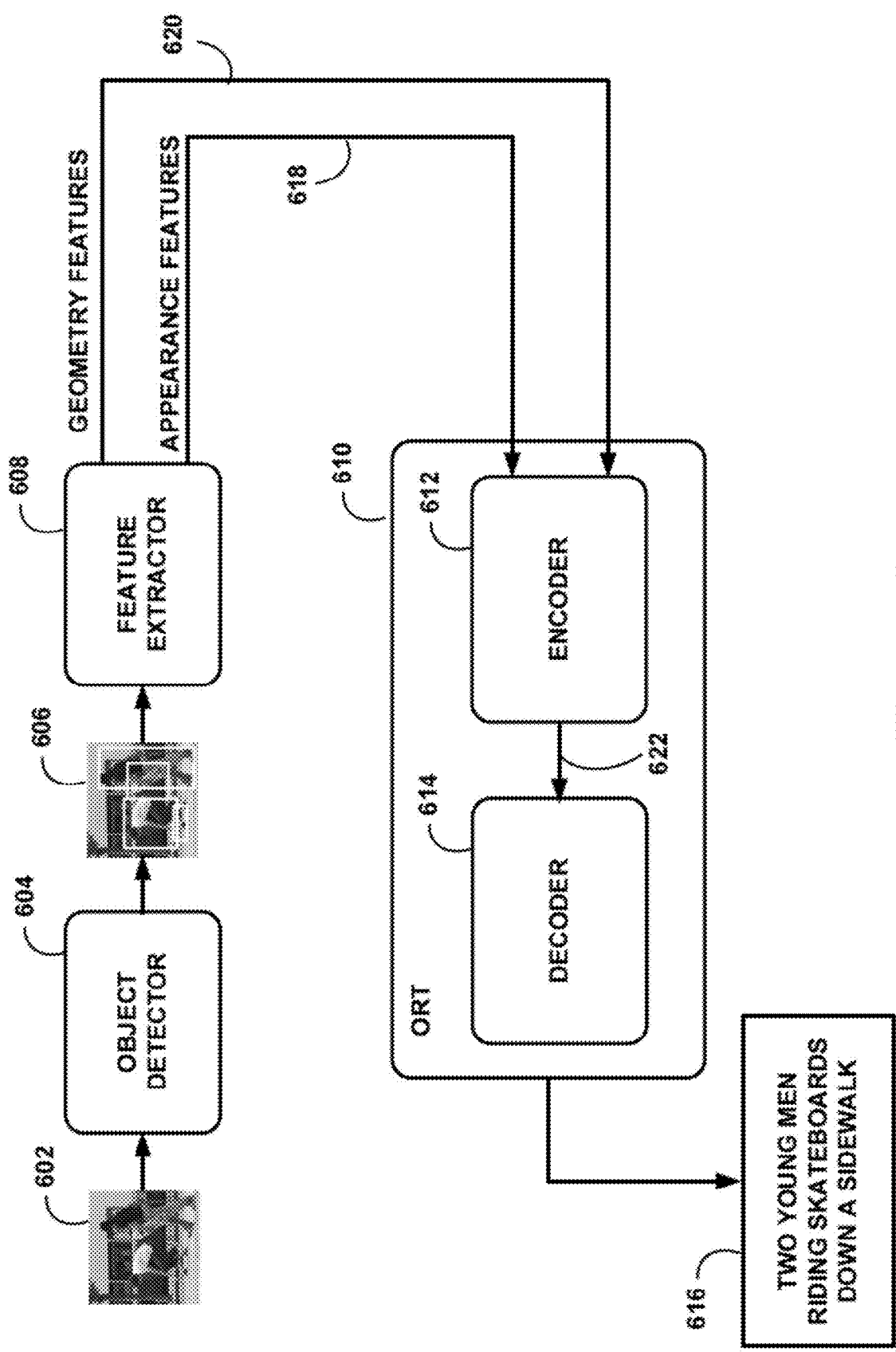
FIG. 6 is a schematic diagram illustrating an exemplary system and process in accordance with embodiments of the present disclosure.

FIG. 6 provides an example of an exemplary system and process in accordance with embodiments of the present disclosure. In the example shown in FIG. 6, the digital content item 602 corresponds to image 502 of FIG. 5. Digital content item 602 is input to object detector 604, which identifies the four objects (shown in image 502) and the four bounding boxes (shown in element 506)—one bounding box corresponding to one of the four detected objects. In the example, element 602 (corresponds to element 506) shows the four bounding boxes 504, 508, 510 and 512 overlaid on the image for purposes of illustration. Information about each bounding box and the digital data representing the image are input to feature extractor 608. Feature extractor 608 extracts appearance features 618 (e.g., comprising an n-dimensional appearance feature vector for each detected object) using the digital data representing the digital content and geometry features 620 using the bounding box information provided by object detector 604.

Appearance features 618 and geometry features 620 are input to ORT 610. In the example of FIG. 6, ORT 610 comprises encoder 612 and decoder 614. Appearance features 618 and geometry features 620 are input to encoder 612 of ORT 610. Encoder 612 uses appearance features 618 and geometry features 620 to generate encoded output 622 for input to decoder 614. As discussed herein, the encoded output that is input to decoder 614 can comprise a set of feature vectors comprising a feature vector for each detected object. Decoder 614 uses the encoded output 622 to generate caption 616 for image 602.

Figure 7:
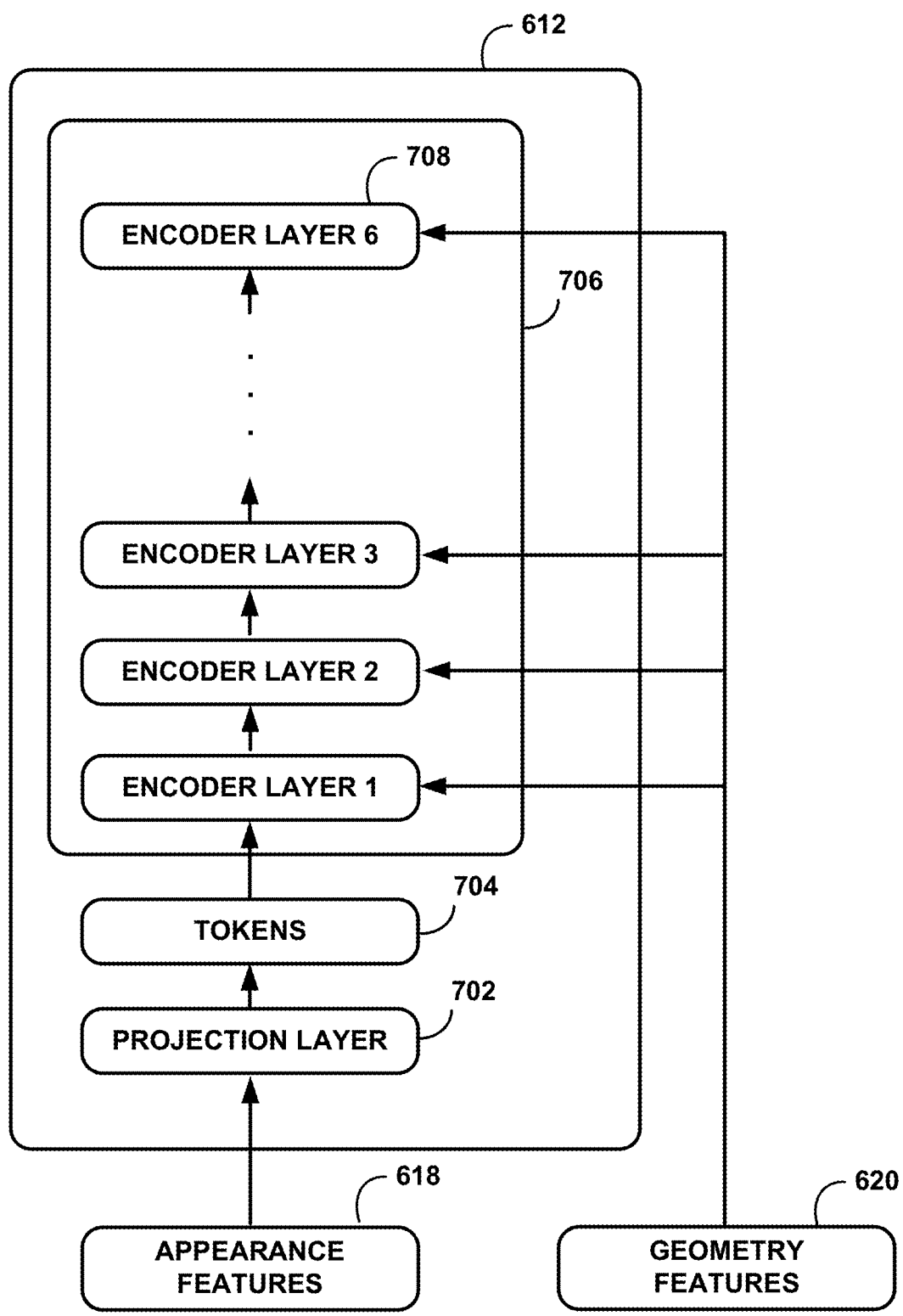
FIG. 7 is a schematic block diagram illustrating components of an exemplary system in accordance with embodiments of the present disclosure.

FIG. 7 provides an exemplary example of components of encoder 612 of FIG. 6 in accordance with embodiments of the present disclosure. In accordance with one or more embodiments of the present disclosure, encoder 612 comprises a number of layers. In the example shown in FIG. 7, encoder 612 comprises six layers—projection layer 702 and encoder layers 706 comprising encoder layers 2-6. It should be apparent that any number of layers may be used for encoder 612.

In the example shown in FIG. 7, appearance features 618 are input to projection layer 702 and geometry features 620 are input to each of the encoder layers 706. Projection layer 702 receives appearance features 618 and generates a set of tokens 704. In accordance with one or more embodiments, each token 704 corresponds to a detected object and comprises the n-dimensional appearance feature vector generated using digital content from the detected object's bounding box. Tokens 704 comprise N tokens corresponding to the N objects detected in the input digital content (e.g., image content 602).

As discussed above and in accordance with one or more embodiments, a mean-pooling mechanism can be applied over the spatial dimension of a bounding box to generate the n-dimensional appearance feature vector (e.g., a 2048-dimension appearance feature vector) for each object's bounding box. The n-dimensional appearance feature vector generated for each detected object comprises input to the ORT's projection layer 702.

In accordance with one or more embodiments, each n-dimensional appearance feature vector corresponding to an object (and the object's bounding box) is first processed through the projection layer of the ORT's encoder 612. By way of one non-limiting example, the projection layer comprises a fully-connected layer, an activation function (e.g., rectified linear unit, or ReLU) and a dropout layer. In accordance with one or more embodiments, the fully-connected layer can be used to reduce the dimension of each appearance feature vector. By way of one non-limiting example, the dimension of the appearance feature vector can be reduced from 2048 to a dimension of 512 (e.g., $d_{model}$=512).

The output of the projection layer 702 comprises embedded appearance feature vectors which are also referred to herein as input tokens, e.g., N input tokens corresponding to N objects detected in image 602. By way of a representation, the $n^{th}$ token (corresponding to the $n^{th}$ embedded appearance feature vector of the $n^{th}$ bounding box)) can be referred to as $x_n$ in a set of N tokens. The set of N tokens becomes input to a first encoder layer of the ORT encoder 612 (e.g., encoder layer 2 of the ORT's encoder 612).

For each of the encoder layers 706 of the ORT's encoder 612, the output tokens of the previous layer (e.g., the previous layer for encoder layer 1 being projection layer 702) becomes input to the next encoder layer. By way of a non-limiting example, the tokens output by projection layer 702 become input for encoder layer 1, the tokens output by encoder layer 1 become input to encoder layer 2, etc. As is discussed in more detail below, the output of encoder layer 6 (e.g., element 708 of FIG. 7) becomes a part of the input to each decoder layer of decoder 614. As discussed herein, a decoder layer of decoder 614 can receive a partially-generated caption (e.g., a sequence of one or more words) generated by the previous decoder layer(s)) of decoder 614.

Figure 8:
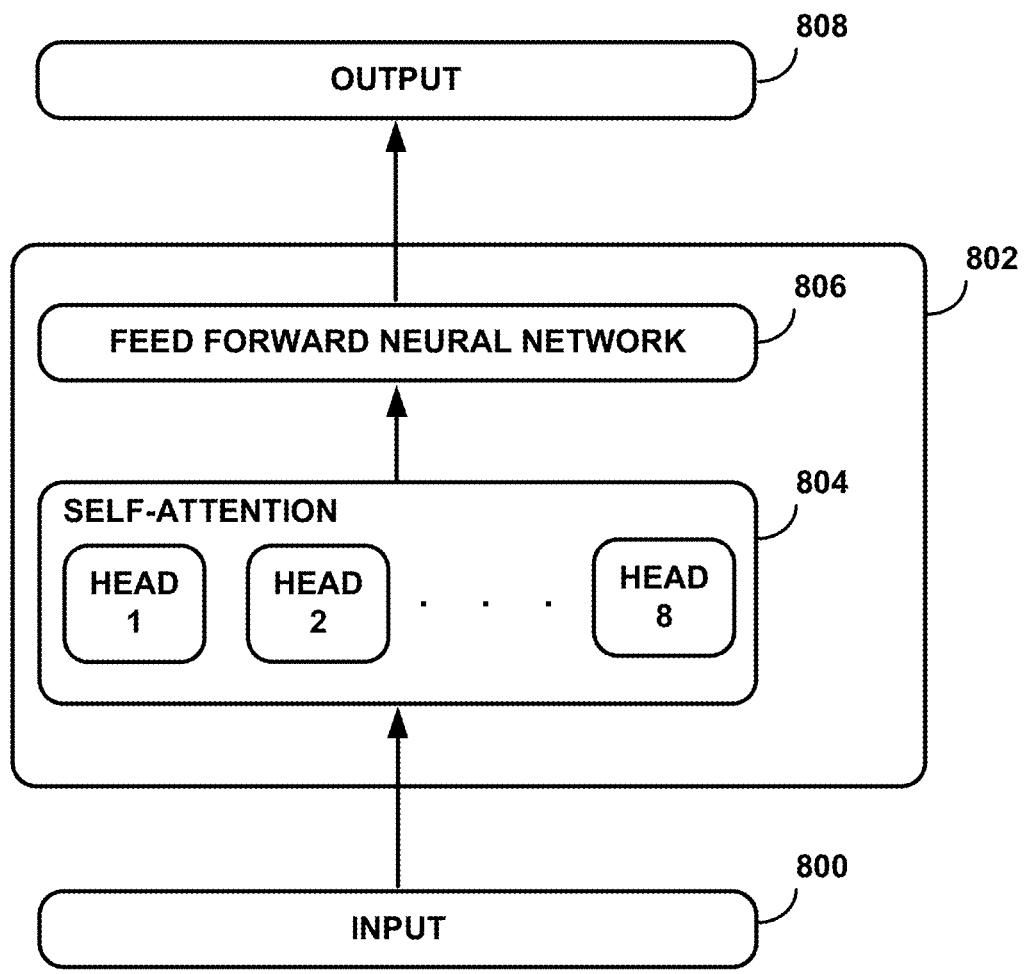
FIG. 8 is a schematic block diagram illustrating components of an exemplary system in accordance with embodiments of the present disclosure.

FIG. 8 provides an example of one of the encoder layers from encoder layers 706 (shown in FIG. 7) in accordance with one or more embodiments of the present disclosure. In the example of FIG. 8, input 800 can comprise tokens (or feature vectors) 704 output by projection layer 702 (e.g., in the case of encoder layer 1). Alternatively and in the case of encoder layers 2-6, input 800 can comprise a set of tokens generated by a previous encoder layer.

In accordance with one or more embodiments, each of the encoder layers 706 consists of a multi-head (e.g., 8 heads) self-attention layer 804 followed by a feed-forward neural network 806. In accordance with some embodiments, self-attention layer 804 assists the encoder layer 802, as it is encoding a detected object, to look at other relevant objects detected in the digital content item. In addition and in accordance with some embodiments, residual connection (or skip connection) and layer normalization can be applied to the outputs of self-attention layer 804 and feed forward neural network (FFN) layer 806.

In accordance with one or more embodiments, self-attention layer 804 comprises 8 identical attention heads. Each attention head (of the self-attention layer 804) determines a set of vectors comprising a query Q, key K and value V for each of the N tokens. An exemplary expression follows:

$$Q=XW_Q, K=XW_K, V=XW_v \qquad \text{Expression (1)}$$

where X comprises the N input vectors (e.g., $x_1 \ldots x_n$) stacked into a matrix and $W_Q$, $W_K$ and $W_v$ are learned projection matrices. The query Q and key K can be used in determining attention weights with respect to each pair of objects.

Figure 9:
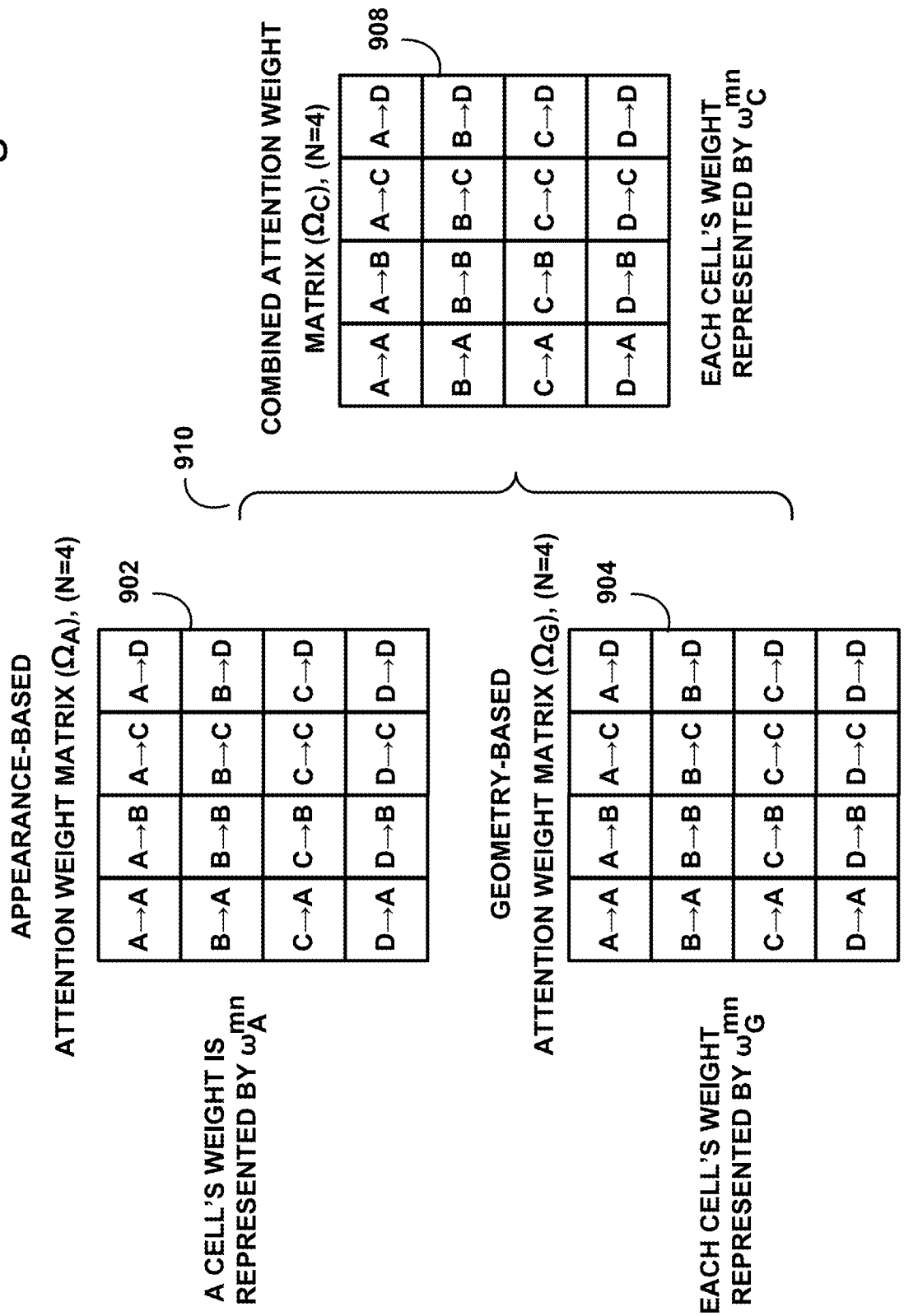
FIG. 9 is a diagram of an exemplary example of a non-limiting embodiment in accordance with some embodiments of the present disclosure.

FIG. 9 provides examples of attention weight matrices in accordance with one or more embodiments of the present disclosure. In the matrix 902, each cell contains an appearance-based attention weight, $\omega_A^{mn}$, with respect to a pair of objects. In some cases, the ordered pair of objects involves the use of one (the same) object (in which case the $m^{th}$ and $n^{th}$ objects are the same objects) and the appearance-based attention weight is with respect to the same object. Alternatively, the ordered pair of objects involves the use of two different objects (in which case the $m^{th}$ and $n^{th}$ objects are two different objects) and the appearance-based attention weight is with respect to the two different objects.

In accordance with one or more embodiments, a matrix of appearance-based attention weights can be computed as follows:

$$\Omega_A = \frac{QK^T}{\sqrt{d_k}} \qquad \text{Expression (2)}$$

where $\Omega_A$ is an N×N attention weight matrix and each element of the matrix (represented as $\omega_A^{mn}$) is an appearance-based attention weight (or visual, or visual-based, attention weight) representing a measure of an appearance-based importance (relevance or relationship) between the $m^{th}$ and $n^{th}$ objects (or tokens). In Expression (2), $d_k$ is a scaling factor with a predetermined, constant value (e.g., 64). In accordance with one or more embodiments, an appearance-based attention weight (e.g., $\omega_A^{mn}$) represents a measure of a visual relationship between the ordered pair of objects, which can be used in the encoding of either object or both objects in the ordered pair.

By way of a non-limiting example, an appearance-based attention weight $\omega_A^{mn}$ for an ordered pair of objects (e.g., the $m^{th}$ and $n^{th}$ objects) can be determined by determining a query vector and a key vector for each object of the ordered pair, determining a score for the ordered pair of objects (e.g., the $m^{th}$ and $n^{th}$ objects) by combining (e.g., combining using a dot product) the $m^{th}$ object's query vector and the $n^{th}$ object's key vector, and then dividing the result by a constant. By way of a non-limiting example, the constant can be square root of the dimension of the learned vectors (e.g., the constant can equal 8 in a case that the dimension of the learned vectors is 64). In accordance with one or more embodiments, the query vector determination for an object can comprise combining (e.g., via matrix multiplication) the object's n-dimensional appearance feature vector and the learned query matrix $W_Q$. In accordance with one or more embodiments, the key vector determination for an object can comprise combining (e.g., via matrix multiplication) the object's n-dimensional appearance feature vector and the learned key matrix $W_K$.

In accordance with one or more embodiments, determination of an object's value vector can comprise combining (e.g., via vector multiplication) the object's n-dimensional appearance feature vector and the learned value matrix $W_V$.

Notably, each appearance-based attention weight (e.g., $\omega_A^{mn}$) in $\Omega_A$ fails to incorporate any spatial relationship between the objects in the ordered pair. In accordance with one or more embodiments of the present disclosure, spatial relationships between an ordered pair of objects can be represented in a geometry-based attention weight (e.g., $\omega_G^{mn}$ of a matrix $\Omega_G$), which can be combined with the corresponding appearance-based attention weight. A geometry-based attention weight (e.g., $\omega_G^{mn}$) can be generated using the geometry features (e.g., geometry features 620) determined for the $m^{th}$ and $n^{th}$ objects. By combining an ordered pairs' appearance-based attention weight and the geometry-based attention weight, a measure of both the visual and spatial importance of one object (e.g., the $n^{th}$) in the encoding of the other object (e.g., the $m^{th}$) can be considered by the encoding layer 802. In accordance with one or more embodiments, a combined attention weight (e.g., $\omega_C^{mn}$) for an ordered pair of objects represents a measure of the spatial and visual relationships between the objects forming the ordered pair, and combined attention weight (e.g., $\omega_C^{mn}$) can be used in the encoding of either object or both objects in the ordered pair.

In accordance with one or more embodiments, geometry features 620 can be incorporated into the ORT encoder layer 802 by combining the appearance-based attention weights matrix $\Omega_A$ determined in Expression (2) above with a geometry-based attention weights matrix $\Omega_G$. In accordance with one or more embodiments, an appearance-based attention weight $\omega_A^{mn}$ corresponding to an ordered pair of objects (e.g., one of the cells in matrix 902 of FIG. 9) is multiplied by a learned function of their relative position and relative size. Determination of a combined attention weights matrix, $\Omega_C$, is discussed in more detail below.

In accordance with one or more embodiments, a spatial relationship vector $\lambda(m, n)$ is determined for a pairing (or ordered pair) of objects, m and n, where m and n can represent the same or two different objects. The spatial relationship vector $\lambda(m, n)$ can be determined using information provided from the respective bounding boxes corresponding to the two objects, m and n. Using the two bounding boxes, each of the objects geometric features can be expressed as $x_m$, $y_m$, $w_m$, $h_m$ and $x_n$, $y_n$, $w_n$, $h_n$, where x and y represent the center coordinates, w represents the width and h represents the height of a bounding box.

The spatial relationship vector can be determined using the following:

$$\lambda(m, n) = \qquad \text{Expression (3)}$$
$$\left( \log\left(\frac{|x_m - x_n|}{w_m}\right), \log\left(\frac{|y_m - y_n|}{h_m}\right), \log\left(\frac{w_n}{w_m}\right), \log\left(\frac{h_n}{h_m}\right) \right)$$

In accordance with one or more embodiments, a geometry-based attention weight corresponding to the $m^{th}$ and $n^{th}$ objects (or tokens) can be determined as follows:

$$\omega_G^{mn} = \text{ReLU}(\text{Emb}(\lambda)W_G), \qquad \text{Expression (4)}$$

where Emb(.) determines a high-dimensional embedding (e.g., to convert the input and output tokens to vectors of dimension $d_{model}$). In accordance with one or more embodiments, a geometry-based attention weight (e.g., $\omega_G^{mn}$) represents a measure of spatial importance of one object (e.g., the $n^{th}$) in the encoding of the other object (e.g., the $m^{th}$) in the ordered pair of objects. In accordance with one or more embodiments, a geometry-based attention weight (e.g., $\omega_G^{mn}$) for an ordered pair represents a measure of the spatial relationship between the objects in the ordered pair, which can be used in the encoding of either object or both objects in the ordered pair.

In accordance with one or more embodiments, the positional encodings have the same dimension (e.g., $d_{model}$) as the embeddings, so that the two can be summed. By way of a non-limiting example, the positional encodings comprise sine and cosine functions of different frequencies:

$$PE_{(pos,2i)}=\sin(pos/10000^{2i/d_{model}}) \quad \text{Expression (5)}$$

$$PE_{(pos,2i+1)}=\cos(pos/10000^{2i/d_{model}}). \quad \text{Expression (6)}$$

where pos is the position and i is the dimension in Expressions (5) and (6). In other words, each dimension of the positional encoding corresponds to a sinusoid. The wavelengths form a geometric progression from $2\pi$ to $10000 \cdot 2\pi$. For any fixed offset k, $PE_{(pos+k)}$ can be represented as a linear function of $PE_{(pos)}$. Alternatively, a learned positional embedding can be used.

Referring again to Expression (4), the embedding can be multiplied with the learned vector $W_G$ to project down to a scalar and then a ReLU non-linearity can be applied. In accordance with one or more embodiments, the appearance-based attention weights matrix, $\Omega_A$ (comprising an appearance-based attention weight, $\omega_A^{mn}$, for each ordered pairing of objects m and n, where objects m and n can be the same or different objects) and the geometry-based attention weight matrix, $\Omega_G$ (comprising a $\omega_G^{mn}$ geometry-based attention weight for each ordered pair of objects, m and n) are combined resulting in a combined attention weights matrix, $\Omega_C$ (comprising a $\omega_C^{mn}$ combined attention weight for each ordered pair of objects, m and n). The combined attention weight (e.g., $\omega_C^{mn}$) for an ordered pair of objects represents a measure of both the appearance (or visual) and the spatial importance of an object (e.g., the $n^{th}$ object) in the encoding of another object (e.g., the $m^{th}$ object) in the ordered pair. To further illustrate, the combined attention weight (e.g., $\omega_C^{mn}$) represents a combined measure of the appearance and spatial relationships between the objects in the ordered pair. In accordance with one or more embodiments, a combined attention weight for an ordered pairing of the $m^{th}$ and $n^{th}$ objects can be determined using the following exemplary expression:

$$\omega_C^{mn} = \frac{\omega_G^{mn}\exp(\omega_A^{mn})}{\sum_{l=1}^{N}\omega_G^{ml}\exp(\omega_A^{ml})}, \quad \text{Expression (7)}$$

where $\omega_A^{mn}$ is the appearance-based attention weight determined for the ordered pair from Expression (2), $\omega_G^{mn}$ is the geometry-based attention weight from Expression (4) and $\omega_C^{mn}$ is a resulting combined attention weight corresponding to the ordered pair of the $m^{th}$ and $n^{th}$ objects.

With reference to FIG. 9, matrix 902 (also referred to as $\Omega_A$) comprises an appearance-based attention weight $\omega_A^{mn}$ for each ordered pair for N=4 objects (or tokens). In addition and in the example of FIG. 9, matrix 904 (represented as $\Omega_G$) comprises a geometry-based attention weight $\omega_G^{mn}$ for each ordered pair for N=4 objects (tokens). Matrix 908 (represented as $\Omega_C$) comprises a combination of the appearance-based and geometry-based attention weights for each ordered pair, where the combined attention weight for a given ordered pair of objects is represented as $\omega_C^{mn}$. Element 910 represents a combination operation used in combining the attention weights. In accordance with one or more embodiments, Expression (7) provides an example of a combination operation for use in combining the appearance-based attention weight $\omega_A^{mn}$ and the geometry-based attention $\omega_G^{mn}$ to yield the combined attention weight $\omega_C^{mn}$ the ordered pairing of the $m^{th}$ and $n^{th}$ objects. Expression (7) can be performed for each ordered pairing (in matrices 902 and 904) to yield matrix 908.

In accordance with one or more embodiments, the combined attention weight matrix $\Omega_C$ is used in determining the output of each head in the self-attention layer (e.g., self-attention layer 804 of encoder layer 802) of encoder 612. In so doing, each ordered pairing of objects m and n has an attention measure which is based on both the appearance (visual) relationship and the spatial relationship between the objects in the ordered pairing. In the exemplary Expression (8) provided below, as an alternative to using either an appearance-based attention matrix (e.g., matrix 902) or geometry-based attention matrix (e.g., matrix 904), the combined attention matrix $\Omega_C$ (e.g., matrix 908), which is a combination of appearance and spatial aspects of each ordered pairing, can be used (e.g., in determining the output of each head of the self-attention layer 804 of encoder layer 802). In accordance with one or more embodiments, the output of each head can be determined using $\Omega_C$ as follows:

$$\text{head}(X)=\text{self\_attention}(Q,K,V)=\Omega_C V, \quad \text{Expression (8)}$$

where $\Omega_C$ is the N×N matrix (e.g., matrix 908) whose elements are given by $\omega_C^{mn}$.

In accordance with one or more embodiments, Expressions (1) to (8) can be used for each head (in self-attention layer 804 of encoder layer 802) independently, and the output of the heads (in self-attention layer 804 of encoder layer 802) can then be combined (e.g., concatenated) yielding one output vector, which is multiplied by a learned projection matrix $W_O$ to generate output of the self-attention layer 804 for input to the feed forward neural network layer 806 of encoder layer 802. Expression (9) provides an example determination of output of an encoder layer 804 for input to feed forward neural network layer 806:

$$\text{Multihead}(Q,K,V)=\text{Concat}(\text{head}_1 \ldots \text{head}_h)W_O \quad \text{Expression (9)}$$

Referring again to FIG. 8, the result of Expression (9) can be output by the self-attention layer 804 of encoder layer 802 to a feed forward neural network (FFN) 806 of encoder layer 802. In accordance with one or more embodiments, FFN 806 can be a point-wise feed-forward neural network. In accordance with one or more embodiments, the FFN 806 receives the output from the self-attention layer 804 as input and processes it to generate encoded output of encoder layer 802 using an expression as follows:

$$\text{FFN}(x)=\max(0, xW_1+b_1)W_2+b_2 \quad \text{Expression (10)}$$

where $W_1$, $b_1$, $W_2$ and $b_2$ are learned weights and biases associated with two fully-connected layers. In accordance with one or more embodiments, residual connection (or skip connection) and layer normalization can be applied to the outputs of the self-attention layer 804 and the FFN layer 806 of encoder layer 802.

Figure 10:
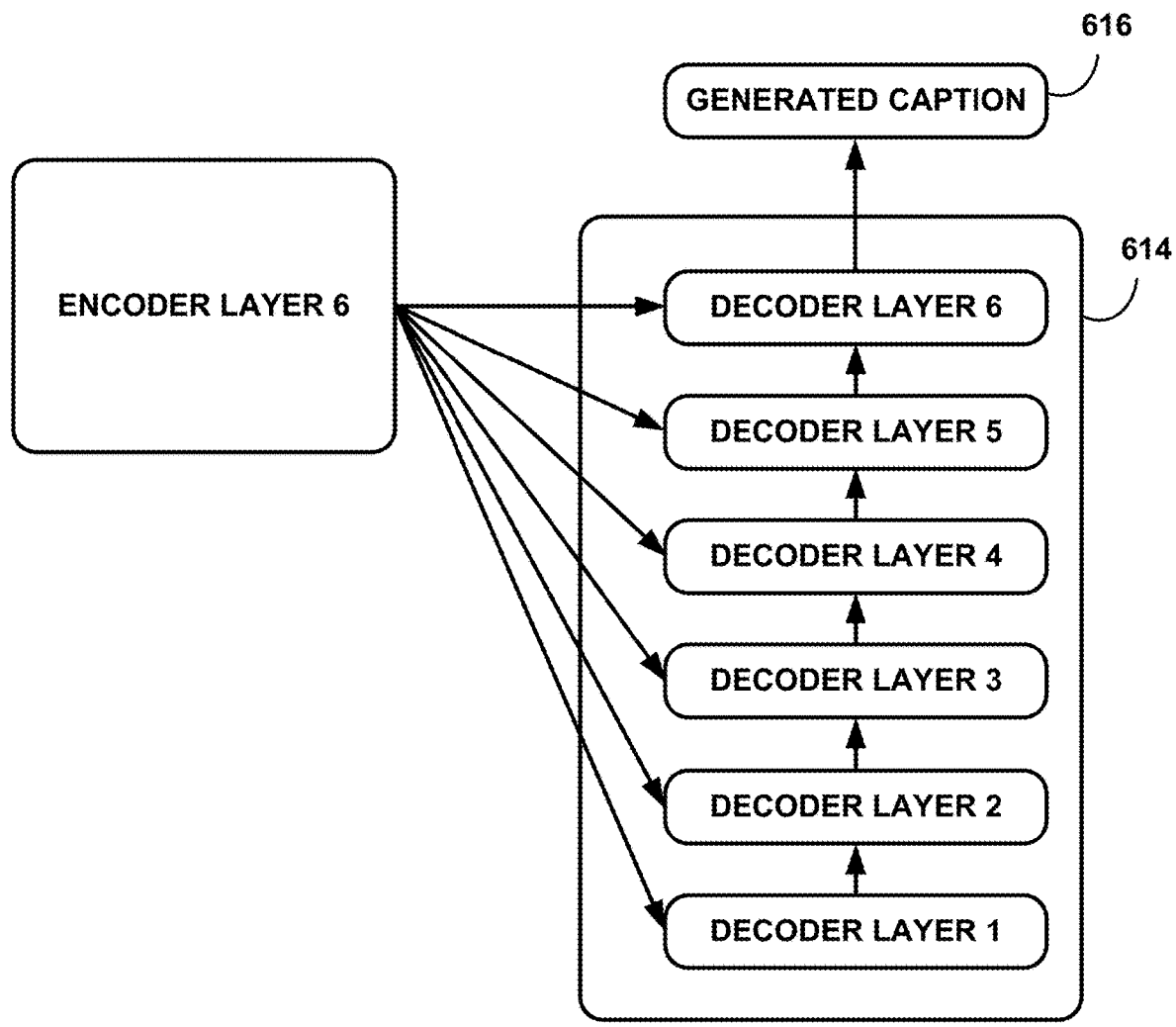
FIG. 10 is a schematic block diagram illustrating components of an exemplary system in accordance with embodiments of the present disclosure.

In accordance with one or more embodiments, the output of the FFN 806 (of encoder 802) comprises a set of tokens (or set of feature vectors) which becomes input to the next step (e.g., another one of encoder layers 706 or decoder 614). By way of a non-limiting example, in the case of encoder layer 2-5, output 808 (e.g., comprising a set of output tokens) becomes input to the next encoder layer (e.g., output of encoder layer 2 becomes input to encoder layer 3, etc.). By way of a further non-limiting example, in a case that encoder layer 802 is the last encoder layer (e.g., encoder layer 6, or element 708, of encoder 612 shown in FIG. 7), output 808 (e.g., comprising a set of output tokens) becomes input to a decoder (e.g., decoder 614 of ORT 610). Decoder 614 then uses the generated tokens from the last encoder layer (e.g., encoder layer 6, or element 708, of FIG. 7) as input to generate a caption (e.g., caption 616). FIG. 10 provides an exemplary illustration of the output of the last encoder layer (e.g., encoder layer 6 corresponding to element 708 of FIG. 7) of encoder 612 being provided to each decoder layer of decoder 614. In accordance with one or more embodiments, decoder 614 has a number (e.g., six) of decoder layers.

Referring again to FIG. 10, the output of each of decoder layers 1-5 becomes a part of the input to the next decoder layer. For example, decoder layer 1 generates a portion of the caption's word sequence and this partially-generated subsequence (e.g., of caption 616) becomes a part of the input to decoder layer 2, decoder layer 2 uses the partially-generated subsequence provided as input (from decoder layer 1) and generates its portion of the caption's word sequence, which becomes a part of the partially-generated subsequence input to decoder layer 3, etc. In addition to the output of the previous decoder layer(s), each of the decoder layers 1-6 receives the output of the last encoder layer (e.g., encoder layer 6 corresponding to element 708 of FIG. 7) of encoder 612. In accordance with at least one embodiment, the output of the decoder 614 is the generated caption 616.

In accordance with at least one embodiment, in the ORT 610, the decoder 614 generates one word of the output caption (e.g., caption 616) at a time, successively from left to right. When the ORT 610 is generating a word at a given position, all of the words that have been generated so far (from previous positions) are fed as input, using standard positional encoding. In accordance with one or more embodiments, positional encoding functions can be used with high-dimensional embedding in the decoder 614. By way of a non-limiting example, positional encoding can provide information about the relative and absolute position of words in the sequence. In addition and in accordance with embodiments of the present disclosure, the output of the encoder is also used as input when generating each word.

In accordance with some embodiments, as an alternative to using a greedy left-to-right generation of words, a beam search technique can be used in generating the output caption (e.g., caption 616). Beam searching constructs multiple simultaneous competing alternate caption hypotheses, eventually picking the one with the highest overall score among them (e.g., the score for an alternate caption hypothesis can be derived from probabilities assigned to the words selected for the alternate caption hypothesis).

Figure 11:
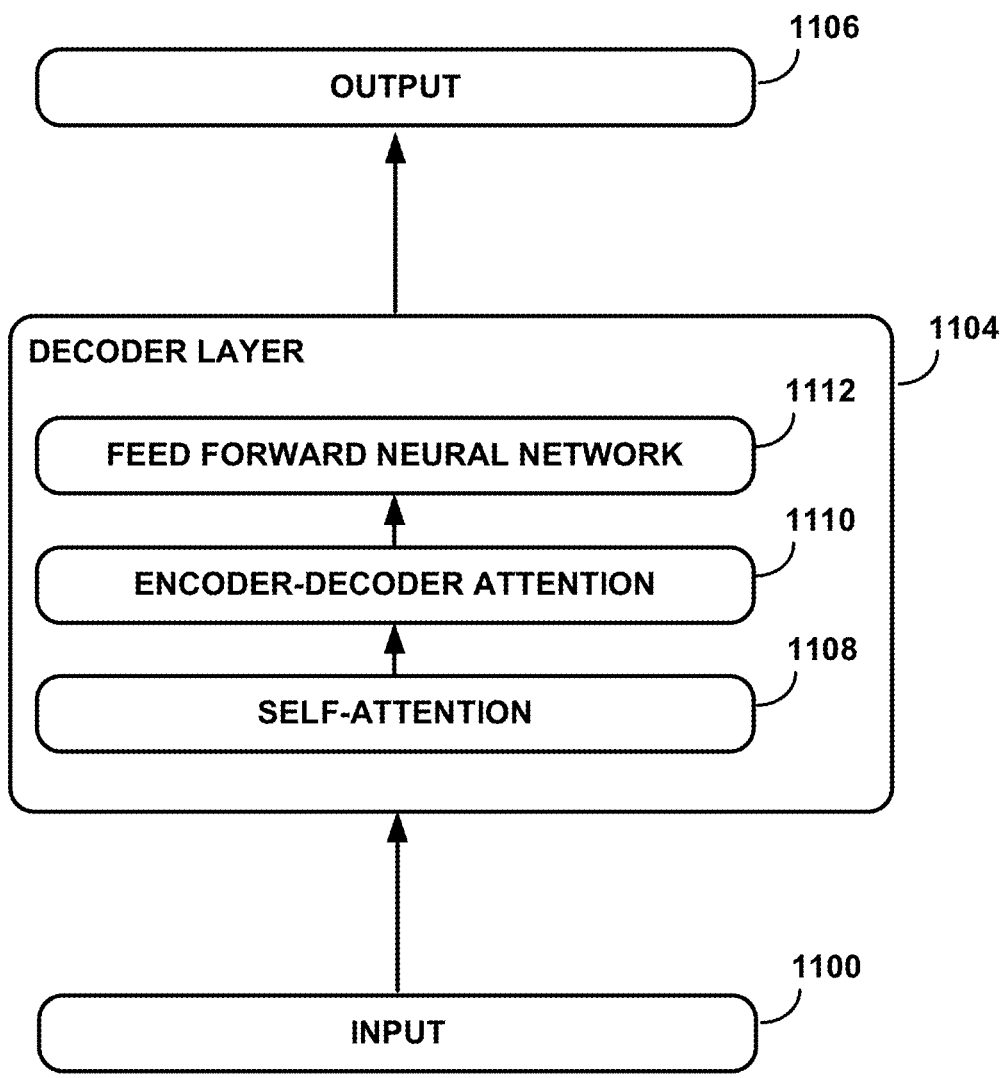
FIG. 11 is a schematic block diagram illustrating components of an exemplary system in accordance with embodiments of the present disclosure.

FIG. 11 provides an example of a decoder layer of decoder 614 in accordance with some embodiments of the present disclosure. In accordance with one or more embodiments, decoder layer 1104 shown in FIG. 11 comprises a self-attention layer 1108 and a feed forward neural network (FFN) 1112. In addition, decoder layer 1104 comprises an encoder-decoder attention layer 1110, which assists the decoder to focus on relevant objects using the attention weight matrix (e.g., matrix 902 of FIG. 9). In the example shown in FIG. 11, encoder-decoder attention layer 1110 is positioned between self-attention layer 1108 and FFN layer 1112.

In accordance with some embodiments, encoder-decoder attention layer 1110 makes use of an attention weight matrix, keys and values from the final output of the encoder, and the queries from the decoder. The decoder query vectors can be produced using a learned matrix, which can be analogous yet different from the encoder's learned matrix for queries. In accordance with some embodiments, the encoder-decoder attention layer 1110 can be defined without using geometry, following a standard procedure of doing inner products of queries by keys and normalizing, with the difference that the queries come from the decoder, and the keys from the encoder.

In accordance with one or more embodiments, the encoder-decoder attention layer 1110 (of decoder layer 1104 in the example of FIG. 11) can comprise a number of heads and can generate query Q matrix using information provided from the decoder layer below it and can use the key K and value V matrices provided by encoder 612. In accordance with one or more embodiments, residual connection (or skip connection) and layer normalization can be applied to the outputs of the encoder-decoder attention layer 1110.

Input 1100 to decoder layer 1104 comprises output from encoder 612. In addition, input 1100 to decoder layer 1104 can comprise the output of each previous decoder layer 1104. As discussed herein, in accordance with at least one embodiment, the input to the decoder layer 1104 can comprise a sequence of tokens. In the case that decoder layer 1104 is the first layer, the tokens are a set of word embeddings summed with their respective positional encodings, where the embeddings correspond to the words of the partial image caption generated so far by decoder 614 (e.g., image caption 616 of FIG. 6). In the case that layer 1104 is not the first layer, the input tokens come from the outputs 1106 of the previous layer. Output 1106 of any decoder layer 1104 can comprise a sequence of tokens, where there is one token for each of the tokens that layer 1104 received as input. In the case that decoder layer 1104 is not the last decoder layer (e.g., decoder layers 1-5 of decoder 614 shown in FIG. 10), output 1106 is provided to the next decoder layer 1104.

In accordance with at least one embodiment, in the case that layer 1104 is the last decoder layer, the sequence of tokens output by layer 1104 can be used to generate scores for words that are candidates to be the next word in the sequence of the output caption. In one embodiment, this can be done by choosing the generated output token at the new word's position, and passing the token through a fully connected layer followed by a softmax operation, whose output is a score or probability distribution over possible next words. In the case of a greedy left-to-right caption generation approach, the word with the highest score is chosen as the next word in the output sequence. In the case of a beam search caption generation approach, multiple output words with high scores may be considered within the beam search algorithm.

In accordance with one or more embodiments, ORT 610 is a transformer model, or transformer, which is a type of neural network architecture, which is trained to "translate" a set of objects detected in a digital content item to generate a caption comprising a sequence of words. In accordance with one or more embodiments, the "translation" considers determined spatial relationships between the objects detected in the digital content item. In accordance with one or more embodiments, the transformer (e.g., ORT 610) architecture can comprise one or more neural networks (e.g., convolutional neural network) together with a number of attention models. The transformer's neural network architecture (including learned functions, weights, etc.) can be trained using machine learning together with one or more datasets used to train as well as test and evaluate the trained model. In accordance with one or more embodiments, the transformer's training includes learning various data structures and functions. For example, the training of the transformer can comprise learning various functions, matrices, vectors, weights and biases such as and without limitation those used in the encoder and/or decoder and in the expressions discussed herein, including without limitation Expressions (1), (4), (9) and (10).

In accordance with one or more embodiments, ORT 610 is trained to encode and decode in accordance with the description provided herein using existing training, test and evaluation datasets. One example of data set is the Microsoft COCO (MS-COCO) 2014 Captions dataset. The MS-COCO comprises photos of 91 object types with 2.5 million labeled instances in 328K images. The MS-COCO dataset is split according to the Karpathy's standard partition of the data into 113 k training images, 5 k validation images, and 5 k test images, with 5 human annotated captions per image.

Figure 12:
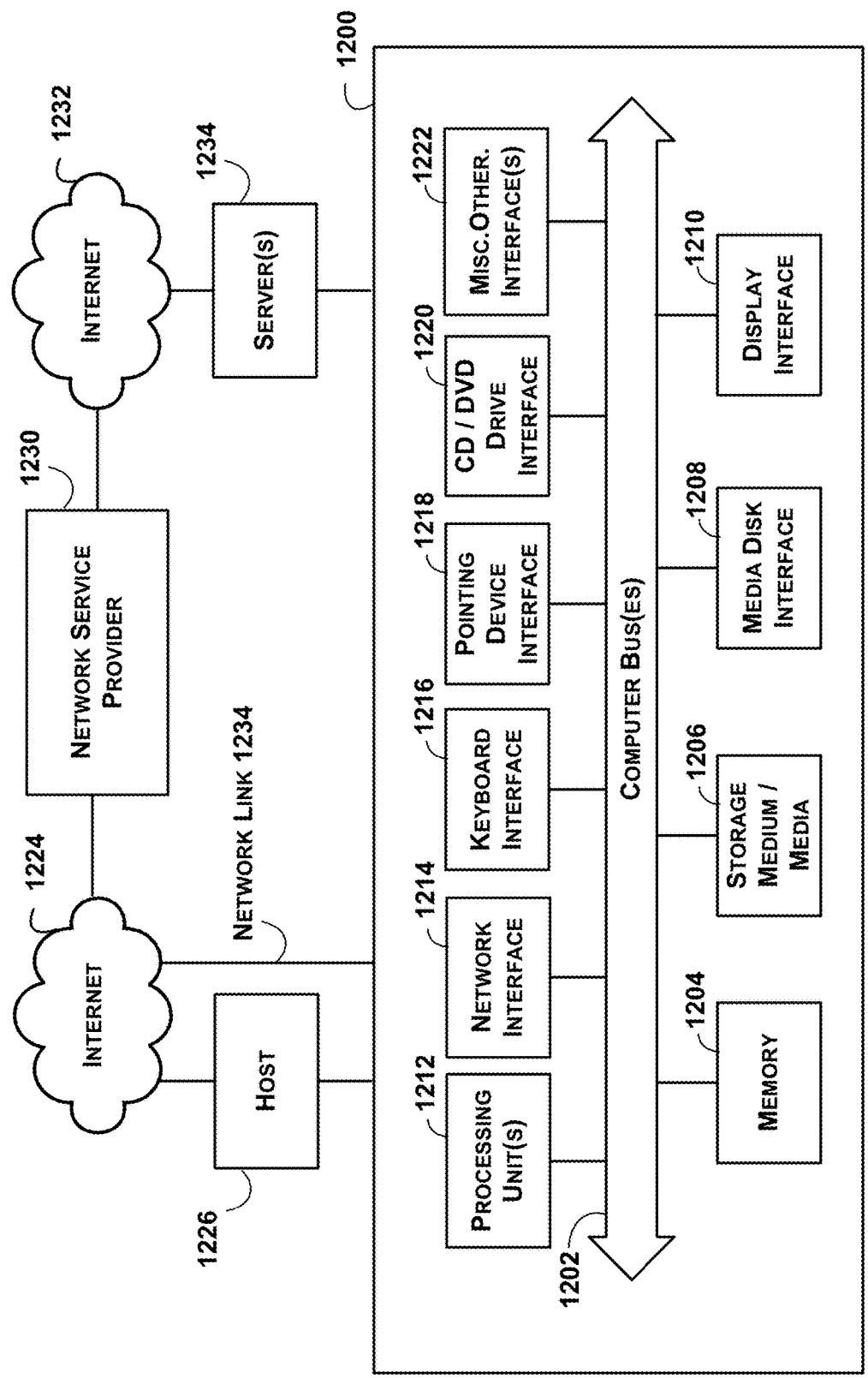
FIG. 12 is a block diagram illustrating the architecture of an exemplary hardware device in accordance with one or more embodiments of the present disclosure.

As shown in FIG. 12, internal architecture 1200 of a computing device(s), computing system, computing platform, user devices, set-top box, smart TV and the like includes one or more processing units, processors, or processing cores, (also referred to herein as CPUs) 1212, which interface with at least one computer bus 1202. Internal architecture 1200 can comprise a GPU (not shown) for efficiently executing one or more deep learning algorithms in accordance with at least one embodiment. Also interfacing with computer bus 1202 are computer-readable medium, or media, 1206, network interface 1214, memory 1204, e.g., random access memory (RAM), run-time transient memory, read only memory (ROM), media disk drive interface 1220 as an interface for a drive that can read and/or write to media including removable media such as floppy, CD-ROM, DVD, media, display interface 1210 as interface for a monitor or other display device, keyboard interface 1216 as interface for a keyboard, pointing device interface 1218 as an interface for a mouse or other pointing device, and miscellaneous other interfaces not shown individually, such as parallel and serial port interfaces and a universal serial bus (USB) interface.

Memory 1204 interfaces with computer bus 1202 so as to provide information stored in memory 1204 to CPU 1212 during execution of software programs such as an operating system, application programs, device drivers, and software modules that comprise program code, and/or computer executable process steps, incorporating functionality described herein, e.g., one or more of process flows described herein. CPU 1212 first loads computer executable process steps from storage, e.g., memory 1204, computer readable storage medium/media 1206, removable media drive, and/or other storage device. CPU 1212 can then execute the stored process steps in order to execute the loaded computer-executable process steps. Stored data, e.g., data stored by a storage device, can be accessed by CPU 1212 during the execution of computer-executable process steps.

Persistent storage, e.g., medium/media 1206, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 1228 typically provides information communication using transmission media through one or more networks to other devices that use or process the information. For example, network link 1228 may provide a connection through local network 1224 to a host computer 1226 or to equipment operated by a Network or Internet Service Provider (ISP) 1230. ISP equipment in turn provides data communication services through the public, worldwide packet-switching communication network of networks now commonly referred to as the Internet 1232.

A computer called a server host 1234 connected to the Internet 1232 hosts a process that provides a service in response to information received over the Internet 1232. For example, server host 1234 hosts a process that provides information representing video data for presentation at display 1210. It is contemplated that the components of system 1200 can be deployed in various configurations within other computer systems, e.g., host and server.

At least some embodiments of the present disclosure are related to the use of computer system 1200 for implementing some or all of the techniques described herein. According to one embodiment, those techniques are performed by computer system 1200 in response to processing unit 1212 executing one or more sequences of one or more processor instructions contained in memory 1204. Such instructions, also called computer instructions, software and program code, may be read into memory 1204 from another computer-readable medium 1206 such as storage device or network link. Execution of the sequences of instructions contained in memory 1204 causes processing unit 1212 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 1200. Computer system 1200 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 1202 as it is received, or may be stored in memory 1204 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:
   obtaining, at a computing device, a digital content item;
   analyzing, via the computing device, the digital content item to detect a plurality of objects depicted in the digital content item, the analysis comprising determining a bounding box for each object of the plurality;
   determining, via the computing device and for each object of the plurality, an appearance feature vector for the object, the appearance feature vector determination comprising analyzing content of the digital content item to generate the appearance feature vector;
   determining, via the computing device and for each object of the plurality, a set of geometry features for the object using the bounding box determined for the object;
   generating, via the computing device, encoded image captioning output using an encoder of a trained image captioning machine model, the appearance feature vector and the set of geometry features determined for each object of the plurality, the encoded image captioning output generation comprising the encoder using spatial relationships among the plurality of objects identified using the set of geometry features determined for each object of the plurality to generate the encoded image captioning output comprising an encoded representation of each object that takes into account the spatial relationships among the plurality of objects; and
   automatically creating, via the computing device and using the trained image captioning machine model, a caption comprising a sequence of words, the automatic caption creation comprising using a decoder component of the trained image captioning machine model to decode the encoded image captioning output to identify the sequence of words of the caption for the digital content item.

2. The method of claim 1, further comprising:
   communicating, via the computing device, the digital content item and the automatically-generated caption to a user for display on a device of the user.

3. The method of claim 1, further comprising:
   communicating, via the computing device, the digital content item and the automatically-generated caption to a device of a user, the communicating causing the automatically-generated caption to be output as audio.

4. The method of claim 1, the appearance feature vector determination further comprising analyzing a region of content within the bounding box determined for the object and analyzing one or more regions of content outside the bounding box determined for the object.

5. The method of claim 1, further comprising using the spatial relationships among the plurality of objects to determine a plurality of geometry-based attention weights, each geometry-based attention weight corresponding to a pair of objects and representing a measure of a spatial relationship between the pair of objects.

6. The method of claim 5, further comprising:
   determining a geometry-based attention weight for an ordered pair of objects from the plurality of objects, the determination comprising:
      determining, via the computing device and using the trained image captioning machine model, the set of geometry features for each object of the ordered pair, the geometry feature set determination for an object of the ordered pair comprising determining center coordinates, a height and a width corresponding to the bounding box determined for the object;
      determining, via the computing device and using the trained image captioning machine model, a spatial relationship vector using the set of geometry features determined for each object of the ordered pair; and
      determining, via the computing device and using the trained image captioning machine model, the geometry-based attention weight for the ordered pair using the spatial relationship vector and a learned vector of the trained image captioning machine model.

7. The method of claim 1, further comprising: determining, via the computing device, a plurality of appearance-based attention weights, each appearance-based attention weight corresponding to a pair of objects and representing a measure of a visual relationship between the pair of objects, the plurality of appearance-based weights being used by the encoder in the encoded image captioning output generation.

8. The method of claim 7, further comprising:
   determining an appearance-based attention weight for an ordered pair of objects from the plurality of objects, the determination comprising:
      determining, via the computing device and using the trained image captioning machine model, a query vector for each object of the ordered pair, the query vector generation for an object of the ordered pair comprising combining the object's appearance feature vector and a learned query matrix;

determining, via the computing device and using the trained image captioning machine model, a key vector for each object of the ordered pair, the key vector generation for an object of the ordered pair comprising combining the object's appearance feature vector and a learned key matrix;

determining, via the computing device and using the trained image captioning machine model, a score for the ordered pair of objects, the score determination for the ordered pair of objects comprising combining the query vector of a first object of the ordered pair and the key vector of a second object of the ordered pair; and determining, via the computing device and using the trained image captioning machine model, the appearance-based attention weight for the ordered pair of objects by a predetermined constant value.

9. The method of claim 1, further comprising:

determining, via the computing device, a plurality of geometry-based attention weights, each geometry-based attention weight corresponding to one ordered pair of objects and representing a measure of a spatial relationship between the ordered pair of objects, the geometry-based attention weight determination comprising using the set of geometry features determined for each object in the ordered pair of objects to determine the geometry-based attention weight corresponding to the ordered pair of objects;

determining, via the computing device, a plurality of appearance-based attention weights, each appearance-based attention weight corresponding to one ordered pair of objects and representing a measure of a visual relationship between the ordered pair of objects, the appearance-based attention weight determination comprising using the appearance feature vector determined for each object in the ordered pair of objects to determine the appearance-based attention weight corresponding to the ordered pair of objects; and generating, via the computing device, a plurality of combined attention weights for use by the encoder in the encoded image captioning output generation, each combined attention weight of the plurality of combined attention weights corresponding to one ordered pair of objects, the combined attention weight generation comprising combining the plurality of geometry-based attention weights and the plurality of appearance-based attention weights.

10. The method of claim 9, there are a plurality of ordered pairs of objects, at least some of the ordered pairs of objects involving the same object in the ordered pair and at least some of the ordered pairs of objects involving different objects in the ordered pair.

11. The method of claim 1, further comprising training the encoder and decoder of the trained image captioning machine model using a training dataset comprising a plurality of digital content items and one or more captions corresponding to each digital content item of the plurality.

12. The method of claim 1, the image captioning machine model comprising a trained neural network architecture.

13. The method of claim 1, further comprising:

determining, via the computing device, the bounding box for an object of the plurality; and determining, via the computing device, the set of geometry features for the object using the bounding box.

14. A non-transitory computer-readable storage medium tangibly encoded with computer-executable instructions that when executed by a processor associated with a computing device perform a method comprising:

obtaining a digital content item;

analyzing the digital content item to detect a plurality of objects depicted in the digital content item, the analysis comprising determining a bounding box for each object of the plurality;

determining, for each object of the plurality, an appearance feature vector for the object, the appearance feature vector determination comprising analyzing content of the digital content item to generate the appearance feature vector;

determining, for each object of the plurality, a set of geometry features for the object using the bounding box determined for the object;

generating encoded image captioning output using an encoder of a trained image captioning machine model, the appearance feature vector and the set of geometry features determined for each object of the plurality, the encoded image captioning output generation comprising the encoder using spatial relationships among the plurality of objects identified using the set of geometry features determined for each object of the plurality to generate the encoded image captioning output comprising an encoded representation of each object that takes into account the spatial relationships among the plurality of objects; and automatically creating, using the trained image captioning machine model, a caption comprising a sequence of words, the automatic caption creation comprising using a decoder component of the trained image captioning machine model to decode the encoded image captioning output to identify the sequence of words of the caption for the digital content item.

15. The non-transitory computer-readable storage medium of claim 14, further comprising:

communicating the digital content item and the automatically-generated caption to a user for output at a device of the user.

16. The non-transitory computer-readable storage medium of claim 14, further comprising using the spatial relationships among the plurality of objects to determine a plurality of geometry-based attention weights, each geometry-based attention weight corresponding to a pair of objects and representing a measure of a spatial relationship between the pair of objects.

17. The non-transitory computer-readable storage medium of claim 14, further comprising:

determining a plurality of appearance-based attention weights, each appearance-based attention weight corresponding to a pair of objects and representing a measure of a visual relationship between the pair of objects, the plurality of appearance-based weights being used by the encoder in the encoded image captioning output generation.

18. The non-transitory computer-readable storage medium of claim 17, further comprising:

determining an appearance-based attention weight for an ordered pair of objects from the plurality of objects, the determination comprising:

determining, using the trained image captioning machine model, a query vector for each object of the ordered pair, the query vector generation for an object of the ordered pair comprising combining the object's appearance feature vector and a learned query matrix;

determining, using the trained image captioning machine model, a key vector for each object of the ordered pair, the key vector generation for an object of the ordered pair comprising combining the object's appearance feature vector and a learned key matrix;

determining, using the trained image captioning machine model, a score for the ordered pair of objects, the score determination for the ordered pair of objects comprising combining the query vector of a first object of the ordered pair and the key vector of a second object of the ordered pair; and determining, using the trained image captioning machine model, the appearance-based attention weight for the ordered pair of objects by a predetermined constant value.

19. The non-transitory computer-readable storage medium of claim 14, further comprising:

determining a plurality of geometry-based attention weights, each geometry-based attention weight corresponding to one ordered pair of objects and representing a measure of a spatial relationship between the ordered pair of objects, the geometry-based attention weight determination comprising using the set of geometry features determined for each object in the ordered pair of objects to determine the geometry-based attention weight corresponding to the ordered pair of objects;

determining a plurality of appearance-based attention weights, each appearance-based attention weight corresponding to one ordered pair of objects and representing a measure of a visual relationship between the ordered pair of objects, the appearance-based attention weight determination comprising using the appearance feature vector determined for each object in the ordered pair of objects to determine the appearance-based attention weight corresponding to the ordered pair of objects; and generating a plurality of combined attention weights for use by the encoder in the encoded image captioning output generation, each combined attention weight of the plurality of combined attention weights corresponding to one ordered pair of objects, the combined attention weight generation comprising combining the plurality of geometry-based attention weights and the plurality of appearance-based attention weights.

20. A computing device comprising:

a processor;

a non-transitory storage medium for tangibly storing thereon program logic for execution by the processor, the program logic comprising:

obtaining logic executed by the processor for obtaining a digital content item;

analyzing logic executed by the processor for analyzing the digital content item to detect a plurality of objects depicted in the digital content item, the analysis comprising determining a bounding box for each object of the plurality;

determining logic executed by the processor for determining, for each object of the plurality, an appearance feature vector for the object, the appearance feature vector determination comprising analyzing content of the digital content item to generate the appearance feature vector;

determining logic executed by the processor for determining, for each object of the plurality, a set of geometry features for the object using the bounding box determined for the object;

generating logic executed by the processor for generating encoded image captioning output using an encoder of a trained image captioning machine model, the appearance feature vector and the set of geometry features determined for each object of the plurality, the encoded image captioning output generation comprising the encoder using spatial relationships among the plurality of objects identified using the set of geometry features determined for each object of the plurality to generate the encoded image captioning output comprising an encoded representation of each object that takes into account the spatial relationships among the plurality of objects; and creating logic executed by the processor for automatically creating, using the trained image captioning machine model, a caption comprising a sequence of words, the automatic caption creation comprising using a decoder component of the trained image captioning machine model to decode the encoded image captioning output to identify the sequence of words of the caption for the digital content item.

* * * * *